(12) United States Patent
Bahl et al.

(10) Patent No.: US 6,385,454 B1
(45) Date of Patent: May 7, 2002

(54) APPARATUS AND METHOD FOR MANAGEMENT OF RESOURCES IN CELLULAR NETWORKS

(75) Inventors: Paramvir Bahl, Issaquah, WA (US); Tong Liu, Waltham, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/170,822

(22) Filed: Oct. 13, 1998

(Under 37 CFR 1.47)

Related U.S. Application Data

(63) Continuation-in-part of application No. 09/169,318, filed on Oct. 9, 1998.

(51) Int. Cl.$^7$ ................................................. H04Q 7/22
(52) U.S. Cl. ........................ 455/450; 455/440; 455/452; 455/456
(58) Field of Search ................................. 455/432, 436, 455/437, 438, 439, 440, 441, 442, 443, 422, 456, 517, 524, 525, 450, 451, 452, 453

(56) References Cited

U.S. PATENT DOCUMENTS

| | | | |
|---|---|---|---|
| 4,751,742 A | | 6/1988 | Meeker |
| 4,797,742 A | | 1/1989 | Sugiyama et al. |
| 4,821,119 A | | 4/1989 | Gharavi |
| 5,109,528 A | * | 4/1992 | Uddenfeldt .................. 455/442 |
| 5,115,309 A | | 5/1992 | Hang |
| 5,214,789 A | * | 5/1993 | George ........................ 455/440 |
| 5,216,503 A | | 6/1993 | Paik et al. |
| 5,315,670 A | | 5/1994 | Shapiro |
| 5,412,741 A | | 5/1995 | Shapiro |
| 5,436,665 A | | 7/1995 | Ueno et al. |
| 5,513,379 A | * | 4/1996 | Benveniste et al. ......... 455/451 |

(List continued on next page.)

OTHER PUBLICATIONS

Molloy et al., "A Video Codec Chipset for Wireless Multi-media Networking", IEEE Sign. Proc. Society Workshop on VLSI Signal Processing, pp. 381–390, Sep. 16–18, 1995.
McCanne et al., "Joint Source/Channel Coding for Multicast Packet Video", Proc. International Conf. On Image Processing, vol. 1, pp. 25–28, Oct. 23–26, 1995.
Sanneck et al., "A New Technique for Audio Packet Loss Concealment", Global Telemcommunications Conference, GLOBECOM '96, pp. 48–52, May 1996.
Mallat, S., "Wavelets for Vision", Proceedings of the IEEE, vol. 84, No. 4, Apr. 1996.
Bahl et al., "Optimizing Resource Utilization in a Wireless Multimedia Network", IEEE Inter. Conf. On Communications, ICC '97, vol. 3, pp. 1432–1437, Jun. 8–12, 1997.
Bahl et al., "H.263 based Video Codec for Real–time Visual Communications Over Wireless Radio Networks", IEEE 6$^{th}$ Int. Conf. On Universal Personal Comm., vol. 2, pp. 773–779, Oct. 12–16, 1997.
Ramchandran et al., "Wavelets, Subband Coding, and Best Bases", Proceedings of the IEEE, vol. 84, No. 4, pp. 541–560, Apr. 1996.

(List continued on next page.)

Primary Examiner—Lester G. Kincaid
(74) Attorney, Agent, or Firm—Leydig, Voit & Mayer, Ltd.

(57) ABSTRACT

Wireless networks require efficient mobility management to cope with frequent mobile handoff and rerouting of connections. The invention treats this problem by developing a hierarchical prediction engine that employs approximate pattern matching and Kalman filtering techniques to yield an accurate prediction of both the immediate next cell to be entered by the mobile and the overall or global route of the mobile unit in the wireless cellular network. The prediction of the mobile's future movement is used by the network to reserve resources, relieve congestion, reduce latency, and optimize the establishment of routes in the wireless cellular network.

36 Claims, 18 Drawing Sheets

U.S. PATENT DOCUMENTS

| | | | |
|---|---|---|---|
| 5,526,052 A | | 6/1996 | Ar |
| 5,572,221 A | * | 11/1996 | Marlevi et al. ............. 455/440 |
| 5,621,467 A | | 4/1997 | Chien et al. |
| 5,625,713 A | | 4/1997 | Allen et al. |
| 5,629,780 A | | 5/1997 | Watson |
| 5,675,384 A | | 10/1997 | Ramamurthy et al. |
| 5,764,805 A | | 6/1998 | Martucci et al. |
| RE35,916 E | * | 10/1998 | Dennison et al. ........... 455/456 |
| 5,825,759 A | * | 10/1998 | Liu ............................ 455/433 |
| 5,877,812 A | | 3/1999 | Krause et al. |
| 5,896,176 A | | 4/1999 | Das et al. |
| 5,936,674 A | | 8/1999 | Kim |
| 5,995,668 A | | 11/1999 | Corset et al. |
| 6,002,802 A | | 12/1999 | Chujioh et al. |
| 6,035,073 A | | 3/2000 | Kaup |
| 6,052,598 A | * | 4/2000 | Rudrapatna et al. ........ 455/456 |
| 6,055,339 A | | 4/2000 | Wilkinson |
| 6,078,616 A | | 6/2000 | Ozcelik et al. |
| 6,111,916 A | | 8/2000 | Talluri et al. |
| 6,125,278 A | * | 9/2000 | Wieczorek et al. ......... 455/440 |
| 6,141,453 A | | 10/2000 | Banham et al. |
| 6,188,905 B1 | * | 2/2001 | Rudrapatna et al. ........ 455/452 |

OTHER PUBLICATIONS

Ghanbari et al., "Cell–Loss Concealment in ATM Video Codecs", IEEE Transactions on Circuits and Systems for Video Technology, vol. 3, No. 3, Jun. 1993, pp. 238–247.

Zhang et al., "Variable Bit–Rate Video Transmission in the Broadband ISDN Environment", Proceedings of the IEEE, vol. 79, No. 2, Feb. 1991, pp. 214–222.

Khansari et al., "Low Bit–Rate Video Transmission Over Fading Channels for Wireless Microcellular Systems", IEEE Trans. on Circuits and Systems for Video Tech., vol. 6, No. 1, Feb. 1996, pp. 1–11.

Podolsky et al., Limited Retransmission of Real–Time Layered Multimedia Signal Processing, pp. 591–596, Dec. 1998.

* cited by examiner

| Editing Operation | UMP | UAP | Spatial Cost |
|---|---|---|---|
| Insertion | b1 b2 b3 | b1 b2 b3 / a | $W_{Iab_2}$ |
| deletion | b1 b3 b4 / b2 | b1 b3 b4 | $W_{Db_2}$ |
| change | b1 b2 b3 b4 | b1 b2 b3 b4 / a | $W_{Cab_2}$ |

Spatial Cost

For $UAP = b_1 b_2 \ldots b_n$ $$W_{Iab_i} = \begin{cases} 1 & a \text{ is the adjacent cell of } b_i, \ i = 1,2\ldots n \\ \infty & \text{otherwise} \end{cases}$$

$$W_{Db_i} = \begin{cases} 0 & b_1 \ldots b_{i-1} \text{ have been deleted} \\ 1 & \text{otherwise} \end{cases}$$

$$W_{Cab_i} = \begin{cases} 1 & a \text{ is the adjacent cell of } a_i, \ i = 1,2\ldots n \\ \infty & \text{otherwise} \end{cases}$$

FIG. 10

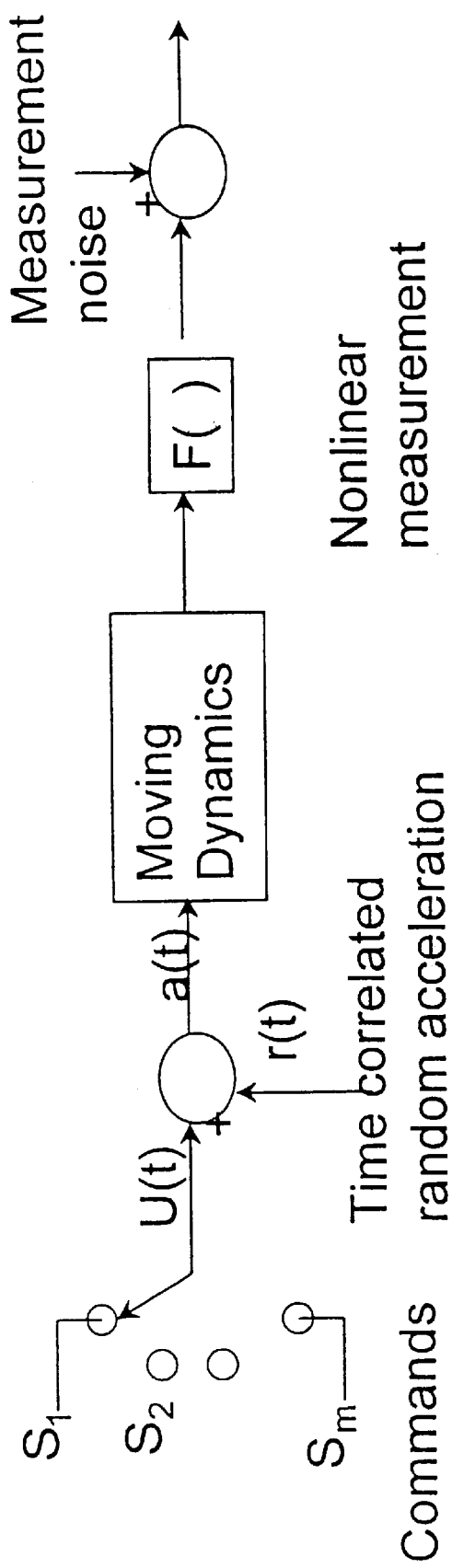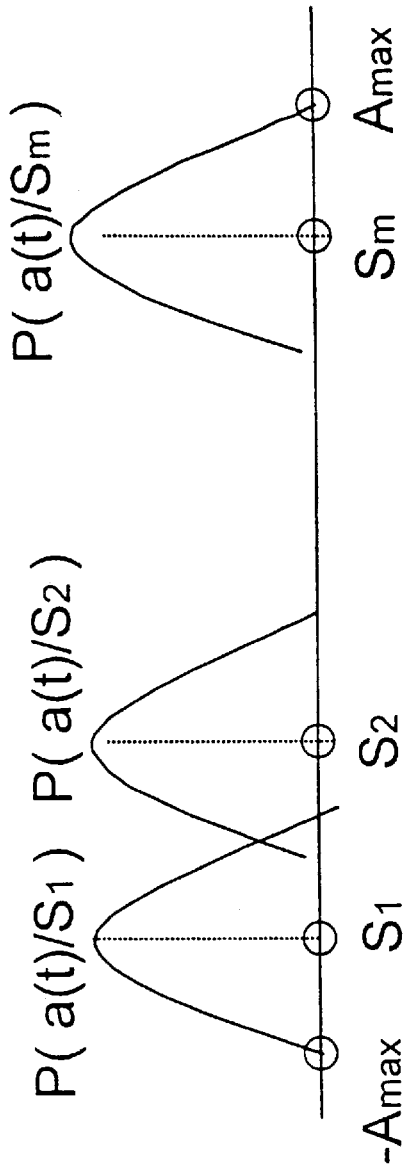
FIG. 11

Determine Edit Distance:

| UAP\UMP1 | 1 | $C_2$ | $C_5$ | $C_8$ | $C_{12}$ | $C_{14}$ |
|---|---|---|---|---|---|---|
| 1 | 0 | 0 | 0 | 0 | 0 | 0 |
| $C_2$ | 1 | 0 | 1 | 2 | 3 | 4 |
| $C_5$ | ∞ | 1 | 0 | 1 | 2 | 3 |
| $C_8$ | ∞ | ∞ | 1 | 0 | 1 | 2 |
| $C_9$ | ∞ | ∞ | ∞ | 1 | 2 | 3 |
| $\hat{C}_{10}$ | ∞ | ∞ | ∞ | ∞ | ∞ | ∞ |

| UAP\UMP2 | 1 | $C_2$ | $C_5$ | $C_4$ | $C_9$ | $C_{19}$ | $C_{18}$ | $C_{17}$ | $C_{16}$ |
|---|---|---|---|---|---|---|---|---|---|
| 1 | 0 | 0 | 0 | 0 | 0 | 0 | 0 | 0 | 0 |
| $C_2$ | 1 | 0 | 1 | 2 | 3 | 4 | 5 | 6 | 7 |
| $C_5$ | ∞ | 1 | 0 | 1 | 2 | 3 | 4 | 5 | 6 |
| $C_8$ | ∞ | ∞ | 1 | 1 | 2 | 3 | 4 | 5 | 6 |
| $C_9$ | ∞ | ∞ | ∞ | 2 | 1 | 2 | 3 | 4 | 5 |
| $\hat{C}_{10}$ | ∞ | ∞ | ∞ | ∞ | 2 | 2 | 3 | 4 | 5 |

Prediction Result:

| Current Cell | d(UAP,UMP1) | d(UAP,UMP2) | Global Prediction |
|---|---|---|---|
| $C_8$ | 2 | 2 | $C_9$ |
| $C_9$ | ∞ | 2 | $C_{10}C_{18}C_{17}C_{16}$ |
| $C_{10}$ | ∞ | 3 | $C_{17}C_{16}$ |

FIG. 15

Parametric Behavior of Next-cell Prediction

APPARATUS AND METHOD FOR MANAGEMENT OF RESOURCES IN CELLULAR NETWORKS

This application is a continuation in part of U.S. application Ser. No. 09/169,318, filed Oct. 9, 1998.

TECHNICAL FIELD

The invention relates to the management of connections to mobile units in wireless communications systems and, in particular, wireless cellular communications systems.

BACKGROUND OF THE INVENTION

Wireless cellular communication systems require efficient mobility management algorithms to cope with frequent handoffs and rerouting of connections, as the mobile units frequently change their points of attachment to the network. Consequently, one of the key challenges for the designers and managers of such systems is to develop a system, which adapts to the mobile unit's mobility by managing connections efficiently in a manner that ensures that an acceptable quality of service (QoS) is provided to the mobile unit.

Mobility management entails both connection management and location management. Connection Management contains both a connection-establishment phase prior to data exchange and a connection-release phase after data exchange. In a wireless network, as mobile units move through cells of the network, connections have to be torn down and re-established with a frequency that corresponds to the speed of the mobile through the cells. Managing the connection during a transition from one cell to another while maintaining the integrity of the data, includes preserving the packet sequencing, preventing packet duplication and avoiding loss of packets.

At the most fundamental level of QoS requirements, is the ability of the network to maintain connectivity with the mobile unit even when the terminal frequently changes its physical location. It is possible to maintain connectivity with the mobile unit and guarantee a certain QoS to it if the network knows prior to the mobile's movement the exact trajectory it will follow. With this information, the network can determine if there are enough resources available along the mobile's path for the lifetime of the connection. If such is the case, the network anticipates the mobile's demands and takes appropriate steps such as setting up end-to-end routes, reserving resources along these routes and planning quick low-latency handoffs between base stations of adjacent cells. With these kinds of preparations QoS can be guaranteed.

An approach for providing QoS to mobile terminals was recently proposed by A. Acampora and M. Naghshineh, in their paper "An Architecture and Methodology for Mobile-Executed Hand-off in Cellular ATM Networks," published in the *IEEE Journal on Selected Areas in Communications*, Vol. 12, No. 4, October 1994, pp. 1365–1375. In this paper the authors propose a technique called the virtual connection tree (VCT) scheme in which connections are pre-established between a fixed (root) switch and a set of base stations with whom the mobile could potentially connect. The VCT approach maintains QoS by pre-establishing end-to-end connections from the base stations with which the mobile unit could potentially attach, and consequently by minimizing handoff latency between base stations (i.e., the time between initiation and completion of the hand off) and by minimizing packet loss, which interrupts the connection. Unfortunately, the VCT approach results in inefficient use of network resources, is a potential source for overloading the network, and requires substantial processing time for setting up and assigning the Virtual Connections (VC). Network inefficiencies occur since the VCs are pre-assigned without accurately taking into account the mobile's current and projected movement patterns. Consequently, many pre-assigned VCs are wasted and efficient resource reservation cannot be achieved.

The VCT approach suffers from the lack of accurate knowledge of the mobile's trajectory. As a result, there is a substantial risk that the connection resources at the base stations will be under utilized, with the mobile never connecting to a reserved channel and potentially overloading the base stations with large numbers of unused reserved channels. Overloading can lead to traffic congestion in a cell, which may result in the base stations either dropping or buffering a connection. Buffering can cause temporary violations of the network's delay and cell loss guarantees and can effect QoS.

As a possible solution to these kinds of problems caused by the VCT approach, the concept of a Shadow Cluster has been proposed. A Shadow Cluster defines the area of influence of a mobile terminal (i.e. a set of base stations or network cells to which the mobile unit is likely to attach in the near future). Like a shadow, this set moves along with the mobile, incorporating new base stations while leaving the old ones as they come under and out of the mobile's influence. Each base station in the Shadow Cluster anticipates the mobile's arrival and reserves resources for it. A close association exists between the predicted time the mobile will arrive at one of the cells of the Shadow Cluster and the time when the cell's resources are reserved. The accuracy of the prediction of the mobile's path determines the number of base stations in which resources are actually reserved and consequently determines the overall network overhead required to maintain the desired QoS.

Location management or location tracking incorporates a set of mechanisms with which the network can locate a particular mobile at any given time. Location updating and location prediction are two strategies that can possibly be used to implement mechanisms for locating a mobile. Location updating is a passive strategy in which the network periodically records the current location of the mobile in a database. Thus, the proficiency of the mobile tracking algorithm depends on the frequency with which the location of the mobile is updated, which in most network systems is controlled by the mobile. In contrast, location prediction is a dynamic strategy in which the network system estimates the mobile's location based on a model of the mobile's movement. The proficiency of the tracking depends on the accuracy of the model and the accuracy of the algorithm used to predict the future movement of the mobile.

While most recent studies have focused on the updating method, relatively little has been done with respect to the prediction approach. As a consequence, management or tracking of a mobile is generally treated as purely a process of updating and querying databases. If accurate prediction of the movement of a mobile was possible, the task of locating mobiles given their last location would become substantially more efficient in terms of both speed and use of system resources.

One way for the network to know the future direction of the mobile is to have a formal mechanism in place that allows the mobile user to indicate to the system his or her intended destination and the duration of the connection. The network can then combine this information with its knowledge of the geography of the terrain and the location of the base stations within the terrain to determine the cellular path of the mobile. Unfortunately, this is not an all-encompassing solution since there may be multiple paths to a destination. Even after using the general direction information provided by the mobile the system cannot exactly determine which one of the multiple paths the mobile will follow on every occasion. It is reasonable to expect that the mobile may diverge from a system selected route without warning in order to adjust to a dynamically changing environment around it. Without the network also dynamically adapting to such a change in the expected cellular route, the amount of resources required to provide improved connectivity is prohibitively great and consequently unattractive and possibly even impractical.

Some previous works in the area of mobility trajectory prediction include a suggestion that the mobile's location be determined based on a behavior model represented as a set of historical movement patterns stored in a user profile. This model can be further refined to be modeled as repetitions of some elementary historical movement patterns of the mobile. Based on these movement patterns, a mobile motion prediction (MMP) algorithm matches the historical patterns to the actual pattern and then predicts or estimates the future location of the mobile. The main drawback of the MMP algorithm is its high sensitivity to the so called "random movements." Any movement of the mobile that cannot be classified by the mobility patterns defined in the user profile is classified as random movement. The accuracy of the prediction of the future location of the mobile by the MMP algorithm decreases linearly with the increase in the random factor ($\gamma$).

Other methods for predicting a future location and speed of the mobile have been attempted using speed and trajectory, but these have generally been limited in scope since they consider rectilinear ("highway") movement patterns only.

SUMMARY OF THE INVENTION

The invention is directed to a system and method for managing resources in a wireless cellular communications system wherein both intra-cell and inter-cell trajectory of the mobile unit are monitored and subsequently used to predict the path it will take for the purposes of reserving bandwidth and setting up routes ahead of time, reducing hand-off latencies, and relieving congestion in the cells along this predicted path. The invention provides a mechanism that combines together a well-known stochastic estimation technique to determine the mobile unit's trajectory and speed at the intra-cellular level with approximate pattern matching technique at the inter-cellular level to substantially increase the system's ability to correctly predict the entire route of the mobile. By enhancing its ability to correctly predict the path of the mobile, the system provides enhanced uninterrupted service to the mobile while consuming minimal resources from the network. This hierarchical relationship is based on a two-tier scheme that combines location updating with location prediction to enhance connection management functions.

By predicting the route the mobile unit will take, the network is able to reserve bandwidth and set up virtual end-to-end connections from the base stations that are in the predicted path of the mobile's route thus ensuring uninterrupted service for the entire duration of the connection. In order to ensure that bandwidth is not needlessly reserved, however, the network reserves resources in each cell along the predicted route based on an estimated time of arrival, for the mobile station into each of the cells. The estimated time of arrival is derived from the signal strength measurements and history of the mobile station. The signal strength measurement is preferably processed by the Kalman estimator in the mobile unit.

The signal strength as measured at the mobile unit is delivered to a prediction engine that is preferably on-board the mobile. The prediction engine tracks the path of the mobile and compares this with previous routes that the mobile has followed as recorded and stored in a memory, which is also preferably on-board the mobile unit. At the prediction engine, the current path of the mobile is referred to herein as the user's actual path (UAP). The prediction engine then matches the UAP to one of the stored previous routes. The stored previous routes are called the User's Mobility Patterns or "UMPs." If no exact match is found, the prediction engine edits the stored UMPs in an attempt to match them to the UAP. The process of editing a UMP includes adding, deleting, or changing one of more cells identity in the UMP. If the amount of editing required to match one of the UMPs to the present path or UAP exceeds a threshold, the UAP is assumed to be new. If the path is a new one, only the Kalman processing of signal strengths that is part of the intra-cell trajectory calculation is relied upon to predict the path of the mobile, which results in the prediction being limited to only the next cell the unit will enter. Otherwise, the UMP that best matches the UAP is used to predict the mobile's future movement, which the system then uses to coordinate bandwidth reservation.

The intra-cell trajectory of the mobile unit is preferably derived from the strengths of the radio signals (RSS) from surrounding base stations. The intra-cell trajectory is used to predict the next cell the mobile unit will enter. By adding the projected next cell to the history of the cellular path of the present connection, the reliability of predicting the overall route of the mobile for the present connection is enhanced considerably. The enhancement is particularly effective in situations where two or more UMPs partially overlap. When the overlapping UMPs diverge, the intra-cell trajectory provides important information for correctly predicting the correct next cell and thus the correct UMP as the predicted route.

Preferably, the prediction of the mobile's future movement during a connection is made by the mobile station. However, the prediction can alternatively be done by the network. For reasons of personal security, however, the UMPs are preferably only maintained at the mobile.

The mobile station communicates the prediction to the network manager, which uses the prediction with the current trajectory of the mobile to manage its communications resources—i.e., the bandwidth of the base stations. The network manager reserves bandwidth in the base stations of cells along the projected route defined by the UMP so that hand-offs of the mobile unit from one base station to another is accomplished efficiently and with minimal degradation of the quality of the communications link. By reserving bandwidth, the network substantially decreases the chances that the connection between the mobile unit and the network will be dropped in an attempted hand-off.

To further enhance the QoS, the invention contemplates that in the case of traffic congestion if a channel is to be borrowed from another cell, the network preferentially borrows channels from cells along the predicted path. By borrowing a channel from the next cell along the predicted route, the network can overcome congestion in the current cell while circumventing the need for hand-offs as the mobile moves into the next cell, thus the quality of the connection is enhanced with a minimum amount of added overhead to the management of the network.

The invention also contemplates assigning a mobile to a base station that is adjacent to one of the cells in the predicted path. If the predicted path through a network cell is in a fringe area where the signals of adjacent cells overlap, the network may elect to reserve bandwidth in the cell that has the lesser amount of traffic. When the mobile enters the predicted cell with the higher amount of traffic, the network will coordinate a handoff to the adjacent cell, which has bandwidth reserved for the mobile in keeping with the invention.

In keeping with the two-tier scheme for predicting the path of a mobile, the prediction mechanism has two main components: (1) global prediction and (2) local prediction. For global prediction, an approximate pattern matching technique abstracts the geometric similarity between the UAP and the stored UMPs, none of which may exactly match the UAP. Using this pattern matching technique, only a few UMPS have to be stored. Each UMP can represent a number of mobility patterns, while maintaining accurate inter-cell prediction.

For local prediction, classical stochastic signal processing techniques are employed to extract user mobility information from noisy measurements. A self-adaptive extended Kalman filter provides a high degree of accuracy for next cell location and instantaneous speed prediction. Local prediction is independent of global prediction so that reasonably accurate short-distance prediction can be obtained even when the system has no knowledge of the user's historical mobility patterns.

Finally, the invention is independent of the architecture of the underlying wireless cellular communications system such as ATM systems. Four strategies, prediction-based dynamic virtual connection trees (PVCT), prediction-based dynamic location update, Congestion relief using line of path channel borrowing and handoff management for mobile units in cellular systems are examples of deployable predictive mobility management in wireless cellular communications systems that are described hereinafter.

A better understanding of the advantages, features, properties and relationships of the invention will be obtained from the following detailed description and accompanying drawings which set forth an illustrative embodiment which is indicative of the various ways in which the principles of the invention may be employed.

BRIEF DESCRIPTION OF THE DRAWINGS

For a better understanding of the invention, reference may be had to a preferred embodiment shown in the accompanying drawings in which:

FIG. 10 illustrates the editing method of the invention in which stored previous sequences of cells $b_n$, which represent known routes of the mobile unit, are matched to the user's actual route through the cells in order to identify one of the known route that is most likely the mobile's actual future route;

FIG. 11 is a model of a typical mobile unit that may incorporate the prediction system and method of the invention, where the model is employed to test the robustness of the route prediction provided by the invention;

FIG. 15 are two matrices that illustrate how the invention uses approximate pattern matching between the user's actual path in FIG. 14 and the two paths stored in memory to select one of the two stored paths as the predicted path;

DETAILED DESCRIPTION OF THE INVENTION

Figure 1:
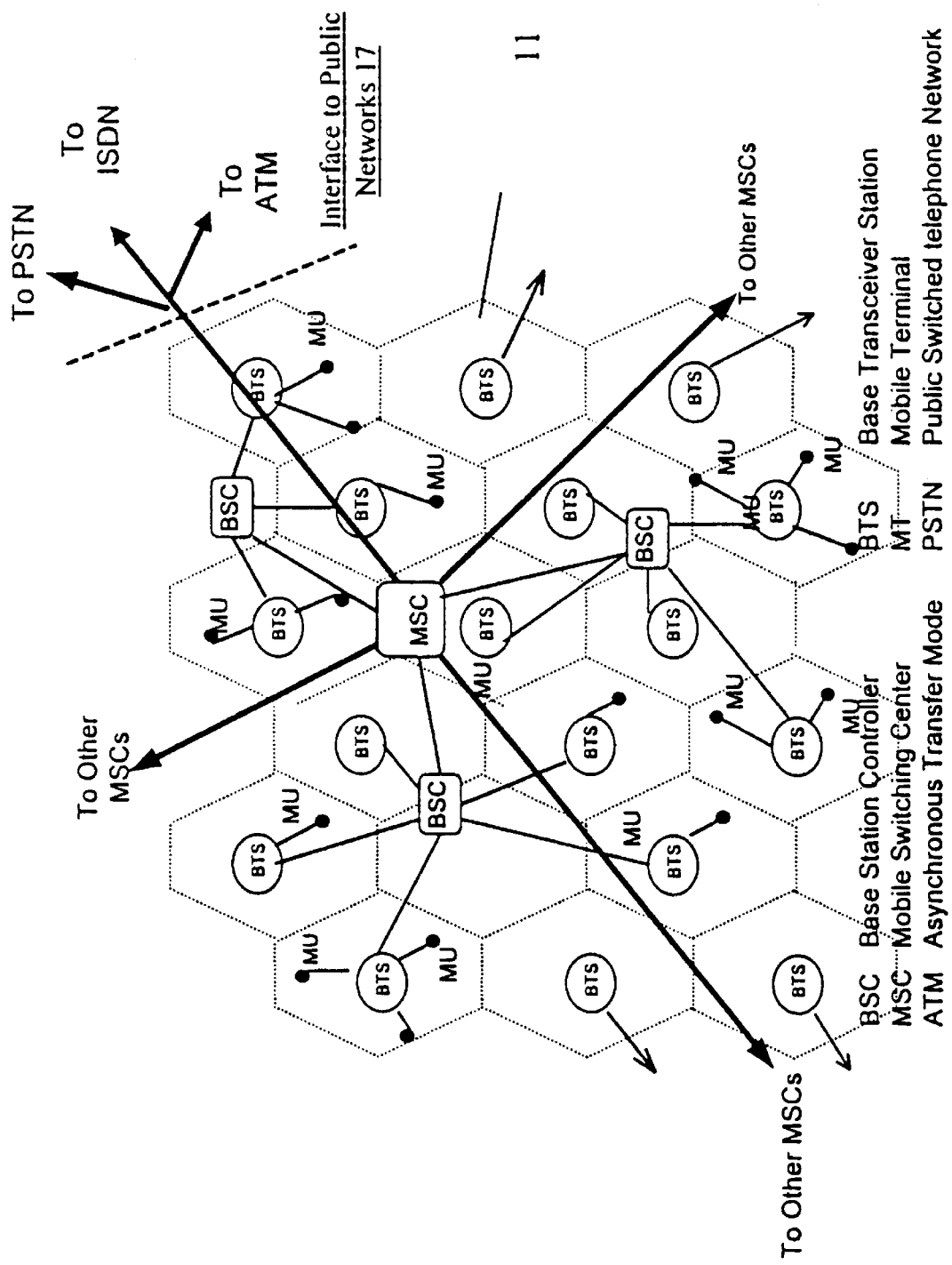
FIG. 1 illustrates the architecture of a conventional cellular communication network that employs the present invention.

Turning to the drawings, wherein like reference numerals refer to like elements, the invention is illustrated as being implemented in a suitable network environment. Although not required, the invention will be described in the general context of computer-executable instructions, such as program modules, being executed by a processing device having a conventional von Neumann architecture—e.g., a personal digital assistant (PDA), a personal computer, a mainframe computer or the like. Generally, the program modules described hereinafter include routines, programs, objects, components, data structures, etc. that perform the particular tasks or implement particular abstract data types of the invention. Also, the invention may be practiced with virtually any mobile device that employs a wireless connection to a cellular network and which has one or more processing devices, such as, for example, mobile telephones. Moreover, the invention may also be practiced in distributed computing environments where tasks are performed by remote processing devices that are linked through a communications network and where program modules are located in both local and remote memory storage devices.

The description that follows will refer to acts and symbolic representations of operations that are performed by the processing devices of either the mobile devices or the network infrastructure unless indicated otherwise. As such, it will be understood that such acts and operations, which are at times referred to as being computer-executed, include the manipulation by the CPUs of the devices of electrical signals representing data in a structured form. This manipulation transforms the data or maintains it at locations in the memory system, which reconfigures or otherwise alters the operation of the processing devices in a manner well understood by those of skill in the art of computer systems. The data structures where data is maintained are physical locations of the memory that have particular properties defined by the format of the data. While the invention is being described in the foregoing context, it is not meant to be limiting since it will be appreciated that various of the acts and operation described herein may also be implemented in hardware.

I. Systems Implementation

Turning first to FIG. 1, the network architecture in which the invention is implemented is similar to a conventional global system for mobility (GSM) architecture. Essentially, each of the mobile units MU within a single cell 11 communicates over a radio channel with a base transceiver station (BTS) of that cell. The BTSs of neighboring cells 11 communicate over wired channels 13 such as fiber-based channels with a base station controller (BSC) that manages them. Several of the BSCs in a geographic region are collectively managed by a mobile switching center (MSC). Each of the BSCs communicates with the MSC over a wired connection 15 that may be high-speed fiber channels as well. The MSCs are in turn connected to the public networks 17 that may include public switched telephone networks (PSTN) or integrated services device networks (ISDN) or asynchronous transport mode (ATM) networks.

Figure 2:
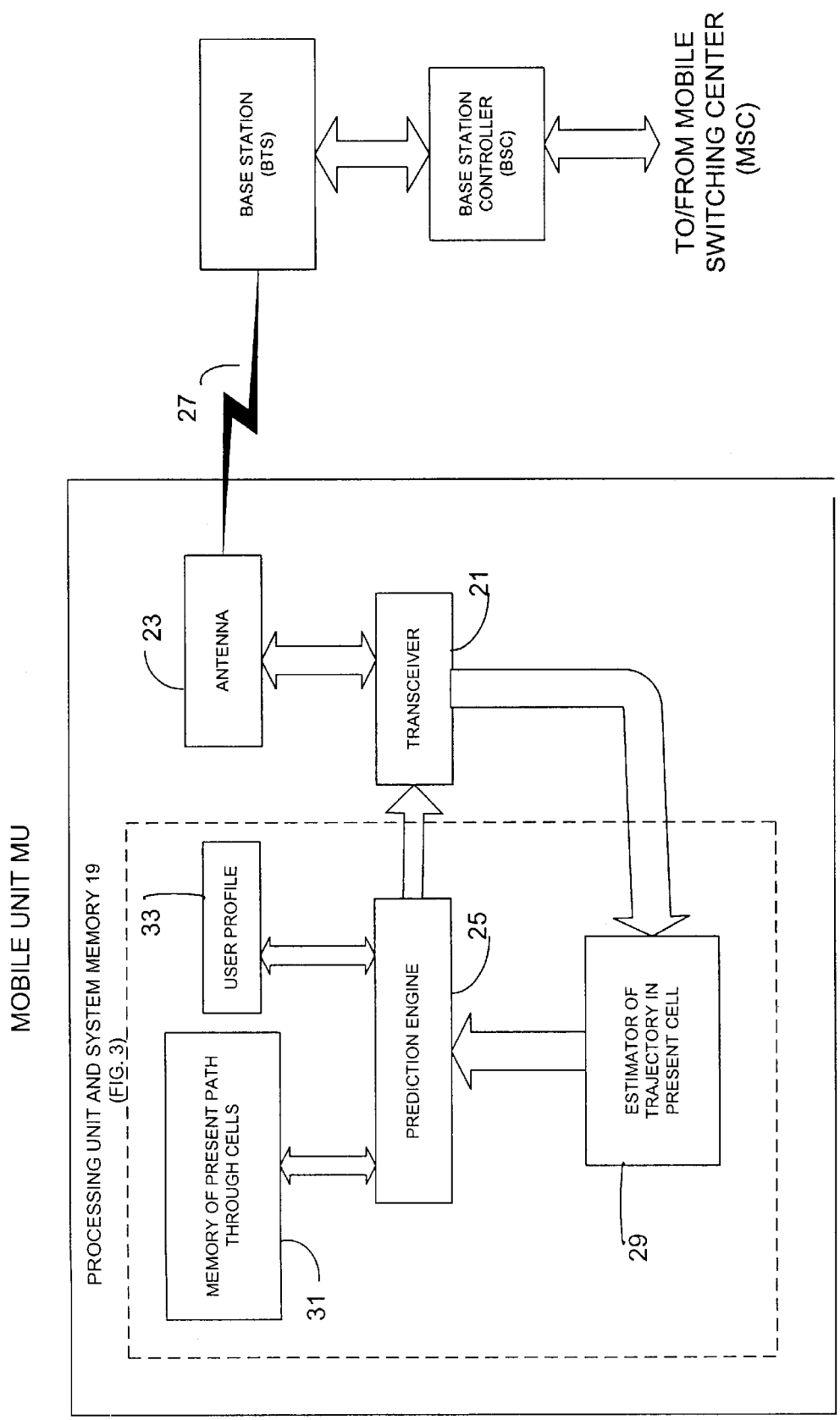
FIG. 2 is a functional block diagram of the component parts of a mobile unit that enable the mobile to predict its path through the cellular communications network of FIG. 1.
Figure 3:
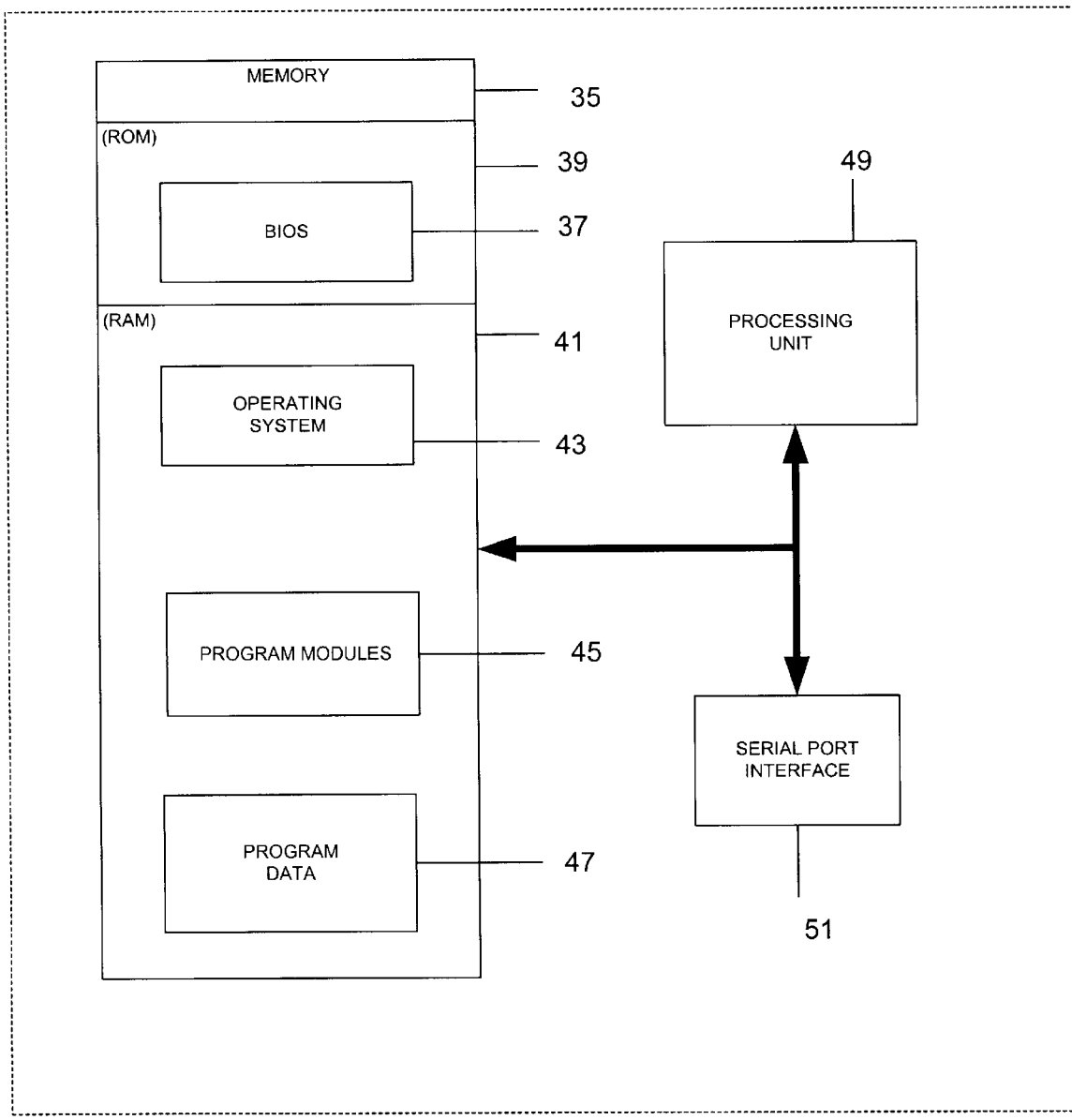
FIG. 3 is a structural block diagram of the component parts of the mobile unit that enable the mobile to predict its path through the cellular communications network of FIG. 1, where the mobile is taken to be a conventional communications device used in cellular networks such as a cellular telephone.

Referring to FIGS. 2 and 3, the mobile unit MU may be a conventional cellular telephone that includes a processing unit and a system memory 19, a transceiver 21 and an antenna 23 as generally indicated in FIG. 2. As explained more fully hereinafter, the processing unit is programmed to provide a prediction engine 25 whose output 25a is a predicted route of the mobile unit MU for its current connection to the network. The prediction engine provides both a global and local prediction of the route to be taken by the mobile. The local prediction provides an identification of the next cell the mobile unit MU is expected to enter. The global prediction includes the local prediction and provides a complete sequence of the expected cells that the mobile unit MU will pass through for the present connection to the network.

The global prediction is delivered to the transceiver 21, which transmits the local or global prediction to the base station (BTS) by way of a conventional RF link 27. The BTS forwards the prediction to the mobile switching center (MSC) by way of the base station controller (BSC). The MSC uses the prediction to manage the allocation of the channel resources in the network in cooperation with the other MSCs that operate with it in concert to manage the connections of the mobile units MU connected to the network. An example of how the MSCs may employ the prediction in managing the resources of the network is described hereinafter in connection with the flow diagram of FIG. 6.

The prediction engine 25 receives information describing the trajectory of the mobile unit MU from an estimator 29, which like the prediction engine is implemented by one or more software routines executed by the processing unit and system memory 19. As explained more fully hereinafter, the estimator 29 uses known techniques to provide a trajectory signal 29a, which the prediction engine 25 uses to predict the next cell the mobile unit MU will enter.

For the global prediction, the prediction engine 25 first adds the predicted next cell from the local prediction to the sequence of cells that the mobile unit has passed through during the present connection. This sequence of cells is stored in a memory 31 and is referred to as the user's actual path or "UAP." The UAP is compared to stored cell sequences that are records of the routes previously taken by the mobile (called hereinafter the "user's mobility patterns" or "UMPs"). The UMPs are stored in a user profile memory 33, which is also part of the processing unit and system memory 19 illustrated in FIG. 2. When the prediction engine 25 identifies a match between the UAP and one of the stored UMPs using criteria described hereinafter, the engine selects the matching UMP as the predicted present route of the mobile unit MU and provides that UMP as the output 25a.

The user profile memory 33 has a data structure in which the UMPs are indexed by their occurrence times. This indexing can be simply by time of day or it can include day of week or even month. By indexing the UMPs by the time of their occurrences, the matching of the UMPs to the UAP of the mobile unit MU can be weighted to account for the time of day, day of week or even the month. Moreover, the technique for matching the UAP to one of the UMPs involves an approximation technique explained more fully hereinafter that desensitizes the matching of the UAP to a UMP from small deviations by the mobile unit MU from its usual routes recorded in the user profile memory 33. By employing this approximation technique, the prediction engine 25 is able to update and manage the user profile memory 33 so that only a limited number of patterns need be stored in the memory while still providing effective prediction.

When the UAP is different from a stored UMP by more than a threshold number of cells and when the mobile unit has available capacity in memory 33, the UAP is stored into the mobile's user profile memory 33 as a new UMP. When the system has no more user profile memory 33 to store an unmatched UAP as a new UMP, the least frequently used UMP is replaced with a new UMP if the oldest stored UMP is no more than a threshold number of days old. In case the oldest UMP is more than a threshold number of days old then this oldest UMP is replaced instead. In an optimized version of this algorithm, instead of storing the entire UMP, only the differences from an existing best-match UMP are stored. When the UAP matches a stored UMP, the internal counter associated with that UMP is incremented and the date and time when this matching occurred is recorded with this counter.

Turning to the hardware diagram of the processor and system memory 19 of the mobile unit MU shown in FIG. 3, the memory system 35 is of a conventional architecture comprising both ROM and RAM portions. In the illustrated architecture, the basic input/output system or BIOS 37 is maintained in the ROM 39. The RAM 41 contains the operating system 43 if one is present. For example the operating system 43 could be Windows® CE operating system. The prediction engine 25 is implemented by programs in the program module 45 of the RAM 41. The program data memory 47 comprises the memories 31 and 33 of FIG. 2, which contain the present (UAP) and previous (UMP) routes of the mobile unit.

The hardware of FIG. 3 includes a processing unit 49 that again can be of a conventional type found in cellular telephones or PDAs such as Intel's x86 or Pentium® processors. The hardware may also include, among other things, accessories such as a serial port 51.

Figure 4:
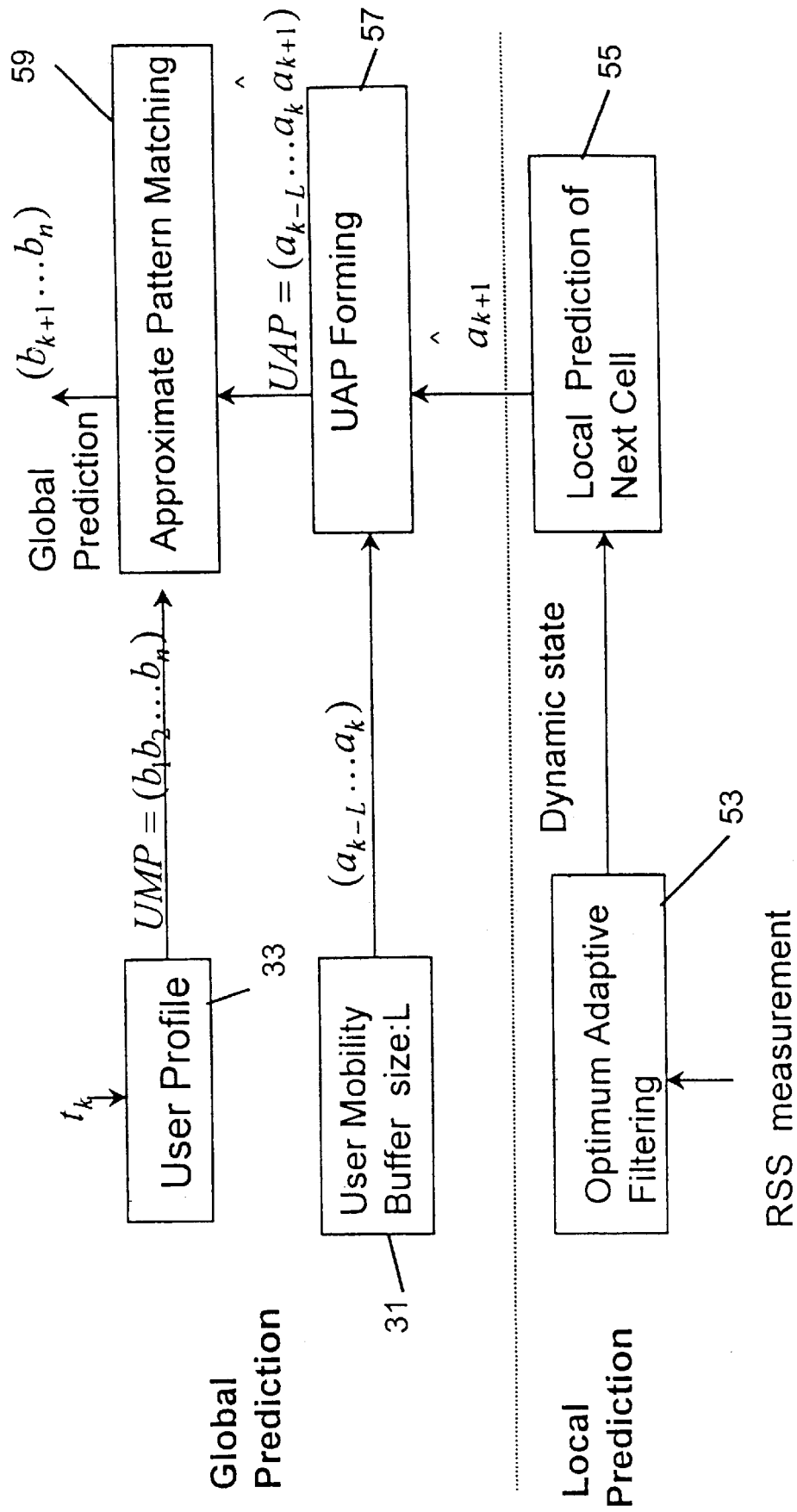
FIG. 4 is a flow diagram illustrating the method of the invention for predicting the future route of the mobile through the network.

Referring to FIG. 4, the prediction engine 25 implements the prediction function illustrated by the steps 53 through 59. In keeping with the invention, both local (LP) and global (GP) predictions are generated by the prediction engine 25. As explained more fully hereinafter, the engine 25 provides an LP prediction when the mobile unit MU is within a "Correlation Area" of an adjacent cell. When the engine determines the mobile unit MU is within the Correlation Area at step 55, it identifies a predicted next cell $a_{k+1}$ and adds at step 57 the predicted next cell to the sequence of cells the mobile unit has already passed through during the present connection. The UAP is then equal to the sequence of cells already passed through plus the next cell predicted by the local prediction at step 55. The sequence of cells a through which the mobile unit MU has already passed are stored in the buffer memory 31. The memory 31 is of sufficient size to ensure that the maximum sequence of cells L for a single connection session of the mobile unit MU can be stored in the buffer memory 31.

When step 55 identifies a predicted next cell a in the path of the mobile unit MU, a new UAP is formed at step 57 and then a new global prediction is generated at step 59. At step 59, the UAP is matched approximately with one of the UMPs cell sequences ($b_n$) in the profile memory 33. As explained more fully hereinafter, the step of matching the UAP to one of the UMPs involves an editing technique that is applied to the UMPs in order to edit each of the UMPs to match the sequence of the UAP. Using criteria described below, step 59 selects the UMP that requires the least amount of editing to match the UAP. The matched UMP is then provided as the output of the prediction engine as the predicted global path or route.

The pattern matching of step 59 may not always identify a UMP that matches the UAP. In these situations, the prediction engine 25 provides only a local prediction of the next cell a that the mobile unit MU is expected to enter. Also, the global prediction is updated each time a new UAP is formed by steps 53, 55 and 57. In this regard, it may occur that a UMP selected to match the old UAP no longer matches the new UAP. Two results may occur. Either a new UMP is selected because it is a better fit in view of the editing criteria or no UMP is selected and the prediction engine 25 gives only the local prediction.

Figure 5:
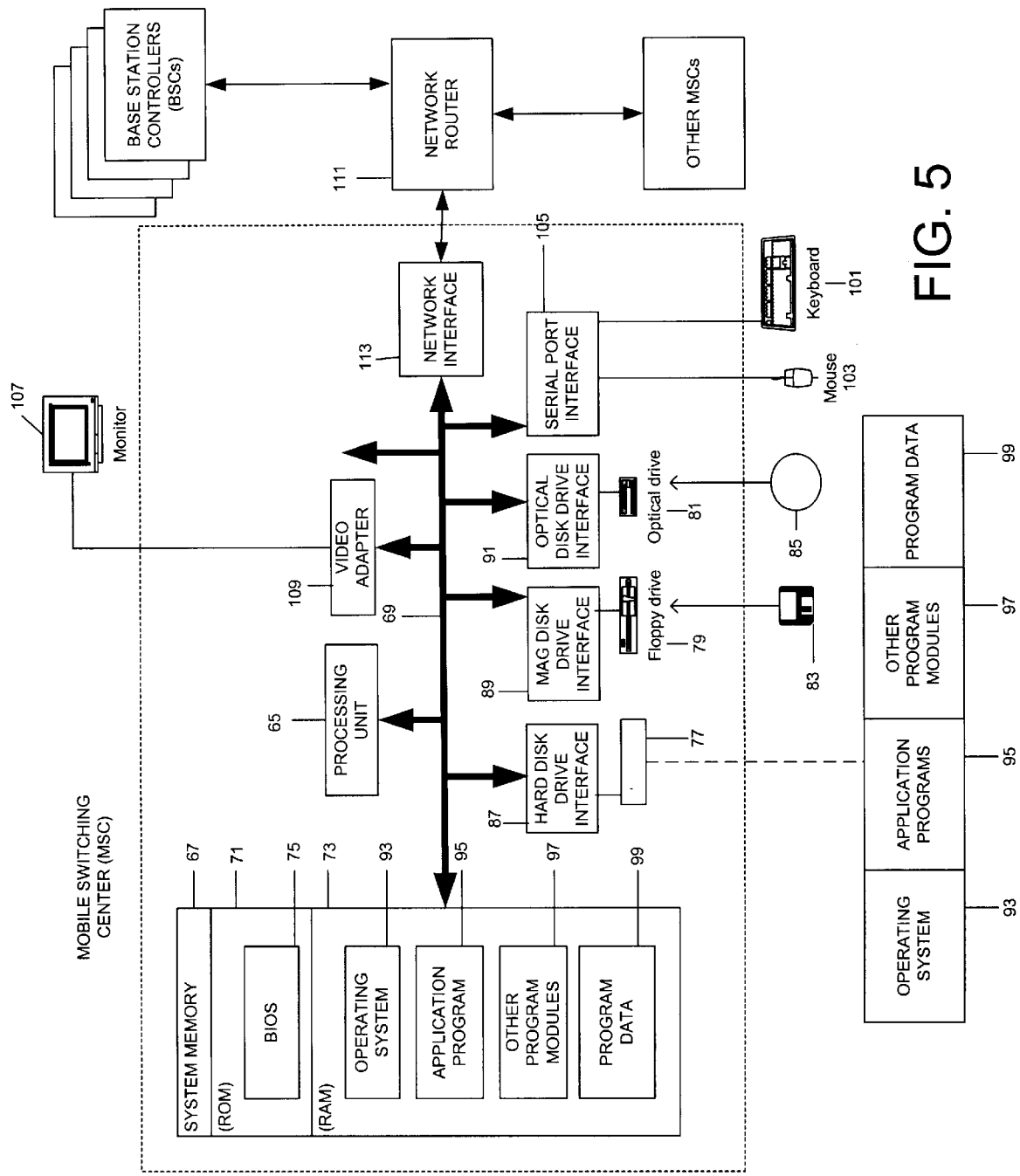
FIG. 5 is a structural block diagram of mobile switching center (MSC) in the cellular communications network that uses the predicted route of the mobile in accordance with the invention to reserve bandwidth in the cells of the predicted route.

In the illustrated implementation of the invention, the MSC as illustrated in FIG. 5 is in the exemplary form of a personal computer. It will be appreciated, however, that the MSC can be of any other architecture that is commonly employed for MSC in conventional cellular networks since the features of the invention can be implemented in software. The precise structure of the MSC is only important to the extent that it must be suitable for the programmed tasks described hereinafter in connection with FIG. 6.

Turning first to the exemplary structure of the MSC illustrated in FIG. 5, it includes a processing unit 65, a system memory 67, and a system bus 69. The system bus 69 functions to couple the various system components including the system memory 67 to the processing unit 65. The system bus 69 may be any of several types of bus structures including a memory bus or memory controller, a peripheral bus, and a local bus using any of a variety of bus architectures. The system memory 67 includes read only memory (ROM) 71 and random access memory (RAM) 73. A basic input/output system (BIOS) 75, containing the basic routines that help to transfer information between elements within the MSC, such as during start-up, is stored in ROM 71. The MSC may also include a hard disk drive 77, a magnetic disk drive 79, or an optical disk drive 81. It will be appreciated that these devices respectively allow for reading from and writing to a hard disk, reading from or writing to a removable magnetic disk 83 and for reading from or writing to a removable optical disk 85, such as a CD ROM or other optical media.

When incorporated into the MSC, the hard disk drive 77, magnetic disk drive 79, and optical disk drive 81 are connected to the system bus 69 by a hard disk drive interface 87, a magnetic disk drive interface 89, and an optical disk drive interface 91, respectively. The drives and their associated computer-readable media provide nonvolatile storage of computer readable instructions, data structures, program modules and other data for the MSC. It will be appreciated by those skilled in the art that other types of computer readable media that can store data may also be used. Examples of such media devices include, but are not limited to, magnetic cassettes, flash memory cards, digital videodisks, Bernoulli cartridges, random access memories, and read only memories.

A number of program modules may be stored in one or more of the memory devices and typically include an operating system 93, one or more applications programs 95, other program modules 97, and program data 99. A user may enter commands and information into the MSC through input devices such as a keyboard 101 and pointing device 103. Other input devices (not shown) are often connected to the processing unit 65 through a serial port interface 105 that is coupled to the system bus, but may be connected by other interfaces, such as a parallel port or a universal serial bus (USB). A monitor 107 or other type of display device is also connected to the system bus 69 via an interface, such as a video adapter 109. In addition to the monitor 107, the MSC may also include other peripheral output devices, not shown, such as speakers and printers.

The MSC operates in the networked environment of FIG. 1 using logical connections to other MSCs and to a number of base station controllers (BSC) as described above. The connection is typically made through a further processing device 111 that is responsible for network routing by way of a network interface 113. In the illustrated embodiment, each of the BSCs includes many or all of the elements described above relative to the MSC such as the memory storage devices. Furthermore, within such a networked environment, it will be appreciated that program modules depicted in the MSC, or portions thereof, may be stored in the memory storage devices of the BSCs.

The MSC uses the predicted route information to schedule resources to best ensure the connection between the mobile and the network is maintained without interruption and with the highest degree off quality possible. In the flow diagram of FIG. 6, the MSC uses the present position of the mobile and its predicted route to manage and reserve communications channels in the cells the mobile unit is expected to enter.

Figure 6:
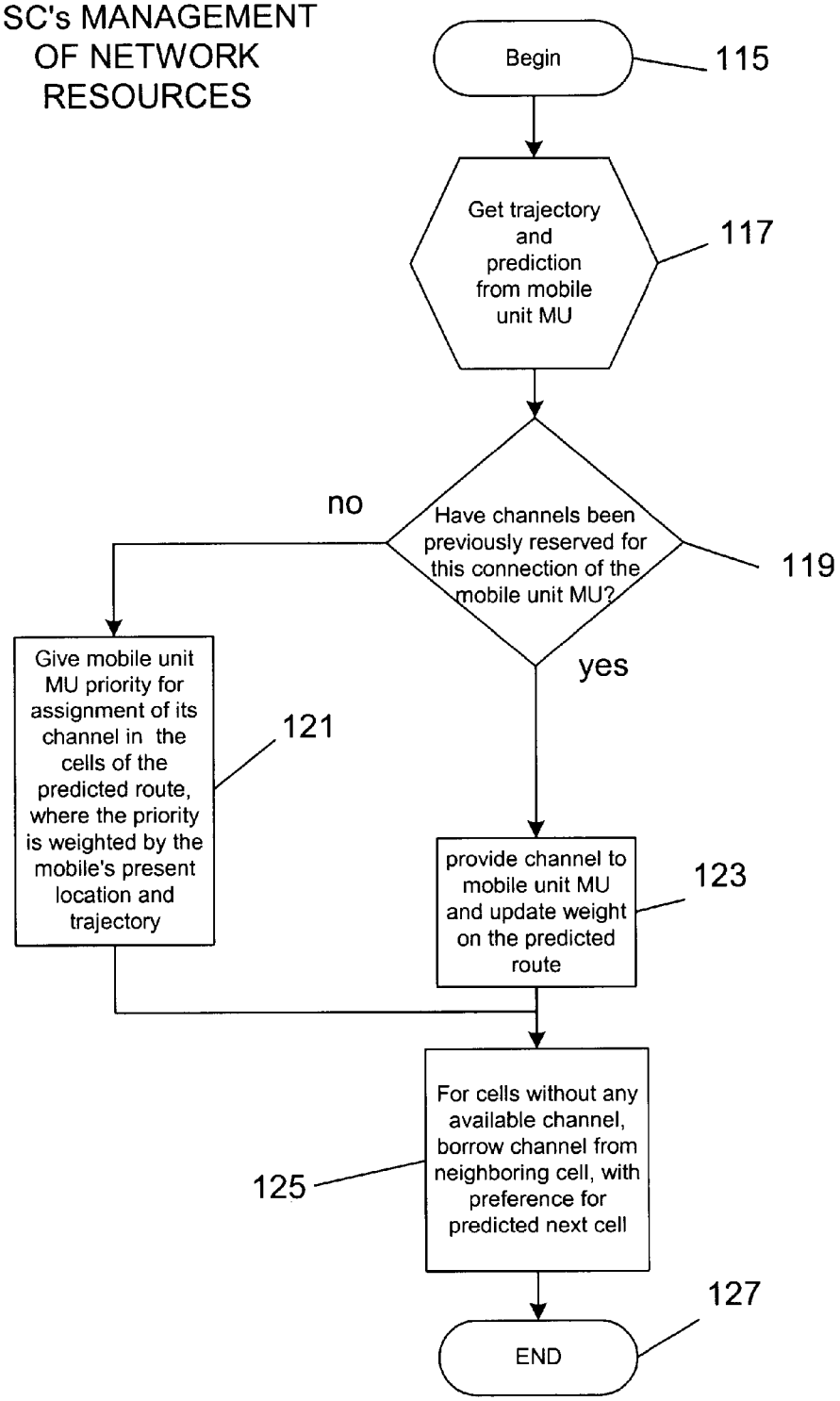
FIG. 6 is a flow diagram of an exemplary strategy that the MSC of FIG. 4 may employ to reserve network bandwidth, knowing the predicted route of the mobile.

One example of a method the MSC may employ to manage the allocation of channel assignments in an effort to maintain the connection is illustrated in the flow diagram of FIG. 6. The process begins at step 115. At step 117, the MSC receives trajectory of prediction information from the mobile unit in keeping with the invention by way of one of the BTSs and the associated BSC. At step 119, the MSC determines whether the prediction is a new prediction or an update of a previous prediction. If the prediction is an update the process branches to step 123, where the new prediction replaces the old one. Otherwise, the process branches to step 121, where the process sets up a reservation request for the mobile unit in the cells identified by the UMP or the local prediction.

The reservation of channel assignments may be implemented so that the reservation is assigned a priority using criteria selected by the network designer. One of the criteria for example might be the present distance of the mobile from the cell holding the reservation. If the trajectory of the mobile unit MU predicts the mobile will not be "handed-off" to the cell from the previous cell for more than a threshold amount of time, then that cell could be free to assign the channel to another mobile. Many different or more sophisticated schemes for managing the network's assignment of the channels may be implemented using the predicted route as will be appreciated by those skilled in the art of cellular communications systems.

I. The Hierarchical Location Prediction

According to the invention, the route of a mobile unit MU in the network of FIG. 1 is predicted by a hierarchical location prediction (HLP) method as illustrated in FIG. 4. As illustrated, the prediction of the movement of the mobile unit MU is carried out at two levels—i.e., local prediction (LP) and global prediction (GP). LP provides a best estimate of the next cell to be crossed based on the instantaneous trajectory of the mobile unit MU and the geometry of the cells in the network, while GP identifies the overall path in a database that best matches the route of the mobile thus far. Using the LP alone, a prediction of the next cell the mobile will move into can be made with a high degree of accuracy.

A. Global Prediction

For global prediction, a predetermined number of the mobile's previous routes are stored in the user profile memory 33 (FIG. 2) as the user's mobility patterns (UMP), which are indexed to the time the routes were taken by the mobile (FIG. 4). The mobile's current path through the cells of the network is tracked in the buffer memory 31 of the mobile unit MU (FIG. 2) as the user's actual path (UAP). The UAP is composed of a sequence of recently crossed cells and a prediction of the anticipated next cell (if any) the mobile will enter.

Most mobile users exhibit some regularity in their daily movement. This regularity is best characterized by a number of User Mobility Patterns (UMPs), recorded in a profile file maintained in the memory 33 for each user and indexed by the occurrence time. The UMPs are similar to the movement patterns in the following references: S. Tabbane, "An Alternative Strategy for Location Tracking," *IEEE Journal on Selected Areas in Communications,* Vol. 13, No. 5, June 1995. G. Y. Liu and G. Q. Maguire Jr., "A Predictive Mobility Management Algorithm for Wireless Mobile Computation and Communication," *Proceedings of the IEEE International Conference on Universal Personal Communications,* 1995. In keeping with the invention, however, the selection of the UMP that best matches the User's Actual Path (UAP) is less sensitive to small deviations of the UAP from the UMPs in the user's profile.

This increased robustness is accomplished, while maintaining the UMPs effectiveness for estimating the mobile's inter-cell directional movement intention, by modeling the UAP as an edited version of a UMP and employing an approximate pattern matching technique to find the UMP that most resembles the UAP. Consequently, the number of UMPs needed to span the network is greatly reduced, which in turn substantially reduces the time needed for pattern classification. Specifically, if a UMP is described by a cell ($a_i$) sequence ($a_1a_2 \ldots a_{i-1}a_ia_{i+1} \ldots a_n$), then the regular movement of a mobile user is modeled as an edited UMP as follows:

inserting a cell c at position i of the UMP gives UAP: $a_1a_2 \ldots a_{i-1}ca_i \ldots a_n$ deleting the cell $a_i$ at position i of the UMP gives UAP: $a_1a \ldots a_{i-1}a_{i+1} \ldots a_n$ changing a cell $a_i$ to another cell c gives UAP: $a_1a_2 \ldots a_{i-1}ca_{i+1} \ldots a_n$.

Figure 7A:
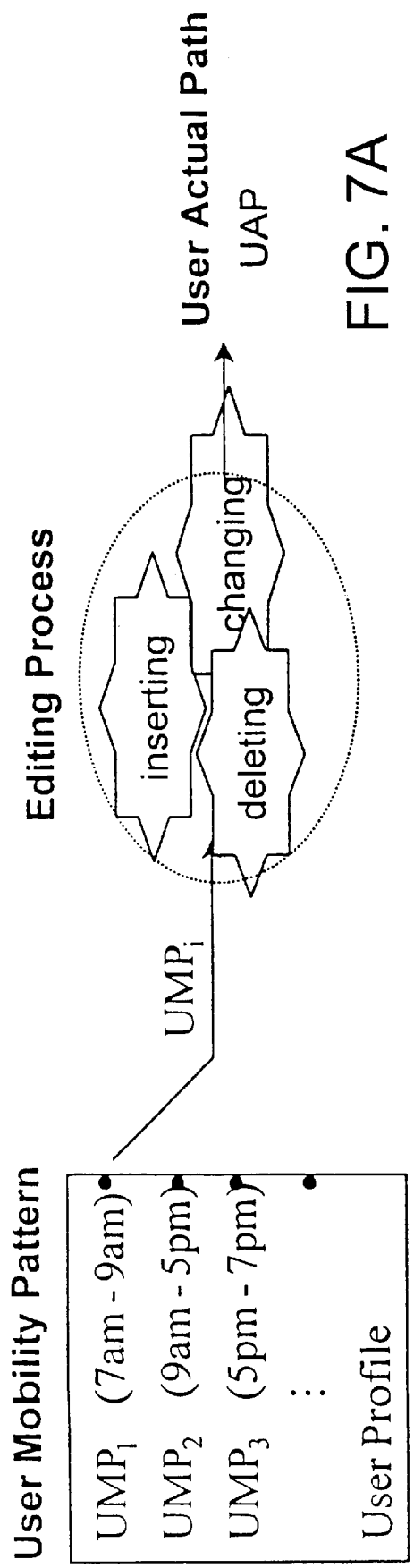
FIG. 7a is a schematic representation of the data structure for the memory containing previous routes of a mobile unit that are used to predict future movement of the mobile when approximately matched with the mobile's present route.
Figure 7B:
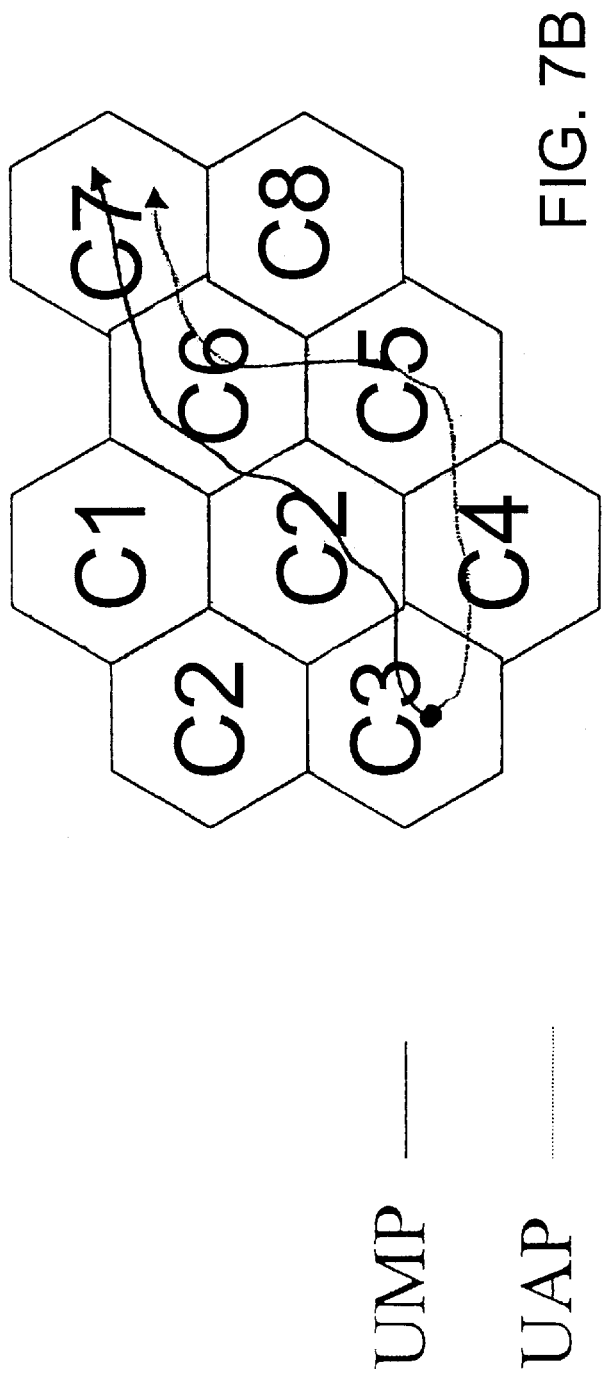
FIG. 7b is an illustration of a cluster of cells in a network illustrating how a historical path or route of the mobile is edited to match the mobile's present route.

FIG. 7a illustrates in a schematic way the data structure of the profile memory 33 in FIG. 2 and its output of various ones of the stored UMPs, which are modified by the editing process 131 of the prediction engine 25. FIG. 7b demonstrates an example of how a UMP sequence of cells $c_3c_0c_6c_7$, is edited by the editing process to become the sequence $c_3c_4c_5c_6c_7$, which matches the user's UAP. In the example, $c_0$ is changed to $c_4$ and $c_5$ is inserted into the sequence.

A further illustration of the editing process is shown in FIG. 10. A sequence of cells $b_n$ are stored in the memory 31 as UMPs, which are edited to compare with a mobile unit's UAP as described herein. In keeping with the invention, the editing of each of the UMPs is assigned a weight. The UMP with the least weight and below a threshold weight is chosen as the predicted global route.

The degree of resemblance between a UAP and a UMP is measured by the editing distance, which is a well-known metric for finite string comparison, P. H. Sellers, "An Algorithm for the Distance between two Finite Sequences," *Journal of Algorithms* 1, 1980, pp. 359–373. The simplest way to find the editing distance is by determining the smallest number of insertions, deletions and changes by which two finite UAP and a UMP cell sequences can be made alike. In order to reflect the geometric relationship between UAP and UMP in a physical domain, a non-negative number is assigned to each edit operation as a spatial weight factor. Using this technique, the edit distance between a UAP and a UMP becomes the sum of the weights of the editing operations, which are chosen not only to make the two cell sequences alike but also to have the smallest possible total weight. If the total weight is less than a threshold t, the UMP with the minimum total weight is selected as the UMP the matches to the UAP.

For large systems or systems with complex network topologies, the calculation of the spatial weights can be quite involved. For the sake of clarity and without loosing generality, the temporary deviation of a mobile user within the neighboring cells of the edited UMP is limited herein. Specifically, the weight is defined as follows:

The cost of inserting a cell c at position i:

$$W_{Ici} = \begin{cases} 1, & c \text{ is the adjacent cell of } a_i \text{ for } i = 1, \ldots n \\ \infty & \text{otherwise} \end{cases}$$

The cost of deleting the cell $a_i$:

$$W_{Dai} = \begin{cases} 0, & a_1, \ldots a_{i-1} \text{ have already been deleleted} \\ 1 & \text{otherwise} \end{cases}$$

The cost of changing a cell to another cell c at position i:

$$W_{Cci} = \begin{cases} 1, & c \text{ is the adjacent cell to } a_i \text{ for } i = 1, \ldots n \\ \infty & \text{otherwise} \end{cases}$$

Both UAP and UMP are finite length sequences, and the memory length of a UAP does not exceed the length of the largest stored UMP. Consequently, it is possible for some subset of the UMP to resemble the UAP, meaning that the edit distance is the minimum of the possible alternatives and less than a threshold t. If a sequence of the UMP is found that resembles the UAP, the remaining sequence of the UMP becomes the output of the global prediction. Additional matching criteria such as the elapsed time can further be applied in case multiple UMP sequences have similar edit distances from the UAP. If no UMP edits to the UAP below the threshold, then no UMP is selected and the prediction engine 25 provides only a local prediction of the movement of the mobile unit MU.

The foregoing can be reduced to the following dynamic programming method: Suppose that the UAP=$a_i, \ldots a_m$, and the UMP=$b_1, \ldots b_n$, the edit distance d($a_1 \ldots a_m, b_1, \ldots b_n$) is computed by constructing a (m+1)×(n+1) matrix ($d_{ij}$), defined by the recursive procedure:

$$d(0, j) = 0, 0 \leq j \leq n$$

$$d(i, 0) = \begin{cases} i, & i = 0, 1 \\ d(i, 0) = \infty, & 0 \leq i \leq m \end{cases}$$

$$d_{ij} = \begin{cases} d_{i-1,j-1}, & \text{if } a_i = b_j \\ \min\{d_{i-1,j-1} + W_{Cij}, d_{i-1,j} + W_{Aij}, \\ d_{i,j-1} + W_{Dij}\} & \text{otherwise} \end{cases}$$

where i=0 and j=0 represent $a_l \ldots a_i$=1 or $b_1 \ldots b_j$=1, with 1 representing an empty sequence. For example, if $a_m$ is the LP of the next cell, the future cell sequence predicted by GP becomes: $a_m, b_{j+1}, \ldots b_n$.

B. Local Prediction

Figure 8:
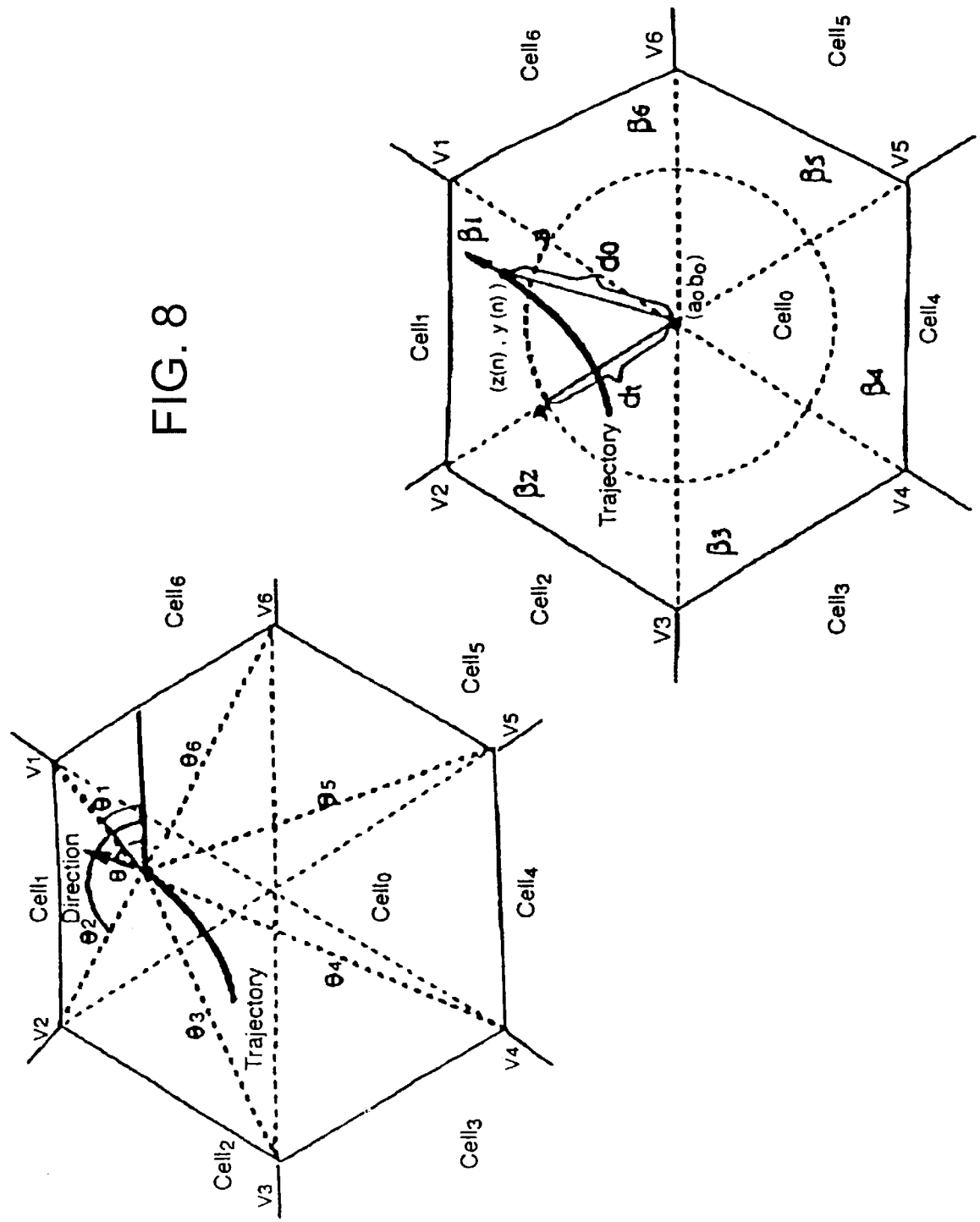
FIG. 8 is an isolated view of a single cell of the network in FIG. 1, showing how the prediction method of the invention incorporates a "local" prediction of the next cell to be entered by the mobile.

In keeping with the invention, the UAP includes a prediction of the next cell that the mobile unit MU will enter. This prediction of the next cell enhances the ability of the invention to successfully predict the complete route of the mobile. FIG. 8 illustrates the tracking of a mobile unit MU in a cell and the prediction of the next cell when the mobile nears the border of the cell as explained more fully hereinafter. The trajectory tracking-based local prediction of the invention enables a kind of look-ahead mode by identifying the UMP that best matches a UAP that includes a prediction of the next cell the mobile will enter.

Figure 9:
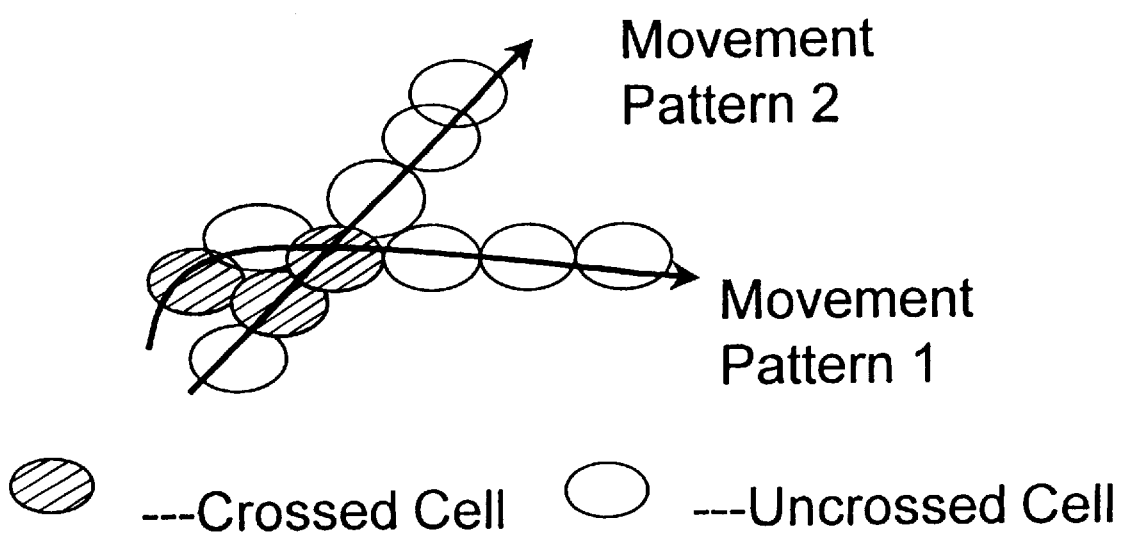
FIG. 9 is an illustration of an isolated few of the cells of the communications network of FIG. 1 in which the actual path of the mobile matches more then one stored route pattern from which the predicted route is determined.

The selection of the UMP is postponed until the local prediction predicts the next cell in the UAP based on the trajectory tracking described hereinafter. In this regard, the local prediction is made when the mobile unit MU enters a zone or area of the cell that is adjacent another cell and called hereinafter the "Correlation Area." As a result of the UAP incorporating a predicted next cell the mobile unit MU will enter, errors in the identification of a UMP are greatly reduced, especially in a cell where there are multiple possible UMPs that fit the historical path of the mobile, as shown for example in FIG. 9.

In the next two subsections, local prediction (LP) is described as being achieved in two steps: First, the dynamic state of a mobile is estimated (step 53 in FIG. 4). Second, the neighboring cell with maximum cell-crossing probability is selected as the next cell in the path of the mobile based on the estimated dynamic state and the geometry of the cell (step 55 in FIG. 4).

1. Estimating the Dynamic State of the Mobile

In existing cellular systems, the distance between a mobile unit and a known base station is observable. This distance can be determined directly from the strength of the received signal, which is a known characteristic of the signal commonly called the received signal strength (RSS). Measured in dB at the mobile station, RSS can be modeled as the sum of two terms, one that describes attenuation of the signal as a function of the length of the path of the signal and another that describes attenuation of the signal due to shadow fading. Fast fading is neglected, using a low pass filter to attenuate Rayleigh or Rician fading. Therefore, the RSS from a particular cell, $p_i$, can be formulated as follows:

$$p_i = p_{oi} - 10r \log d_i + \xi_i \tag{1}$$

where $p_{oi}$ is a constant determined by transmitted power, wavelength and antenna gain of a cell; r is a slope index (typically r=2 for highways and r=4 for micro-cells in a city); $\xi_i$ is the logarithm of the shadowing component, which is found to be a zero-mean Gaussian random variable with standard deviation 4–8 dB; and, d is the distance between the mobile and the base station of the cell, which can be further expressed as shown below in terms of the mobile's position (x(n) y(n)) at time n and the location of base station (a, b):

$$d_i = [(x(n) - a_i)^2 + (y(n) - b_i)^2]^{1/2} \tag{2}$$

To locate a mobile unit MU in the two-dimensional domain of a surface route, at least three independent distance measurements are needed. The necessary data are available in known systems where approximately twice a second the mobile unit MU samples the signal levels of neighboring cells. Preferably, the three largest measurements p are selected to form the observation vector, $Z_n = [p_1 \ p_2, \ p_3]^T$, which is non-linearly related to the dynamic states $X_n$:

$$Z_n = h(X_n) + \epsilon_n \tag{3}$$

where $X_n^*$ can be derived from equations (1) and (2) above. Applying the linearization method used to design extended Kalman filters, where the linearization takes place about an estimated trajectory, the linearized measurement equation becomes:

$$Z_n = HX_n + \xi_n \text{ with } H = \left.\frac{\partial h}{\partial x}\right|_{x = x_n^*} \tag{4}$$

where Z is the trajectory of the mobile unit.

For the first step, an optimum adaptive filter (FIG. 4) is needed for real-time dynamic state estimation. As discussed above, since the instantaneously sampled trajectory of the mobile is a non-stationary process, a modified Kalman filter is the best candidate for achieving low-level local prediction. The conventional Kalman filter is modified since it is not designed for deterministic input $U_n$, which is represented as a semi-Markovian process with m possible (mobile acceleration) states. The problem of dealing with the randomness within the states is overcome by using a bank of m filters with each filter operating on a possible state. When certain practical assumptions are made, as discussed in R. L. Moose, and H. F. Vanlandingham, "Modeling and Estimation for Tracking Maneuvering Targets," *IEEE Transactions Aerospace and Electronic Systems*, Vol. 15, No. 3, May 1979, the filter bank can be reduced to a single Kalman filter augmented by a recursive technique of estimating $U_n$. The adaptive state estimator then becomes:

$$\hat{X}_{n+1} = A\hat{X}_n + B\hat{U}_n + K_{n+1}(Z_{n+1} - HA\hat{X}_n - HB\hat{U}_n) \quad (7)$$

where $$\hat{U}_n = \sum_{i=1}^{n} U_n(S_i) P(S_{n+1}^i / Z_{n+1})$$

Here $K_{n+1}$ is the standard Kalman gain matrix, and $\hat{U}_n$ is an estimate of $U_n$. The recursive technique for computing $\hat{U}_n$ is developed in detail in the Moose et al. publication identified above, the final results of which are given by the following equations:

$$\hat{U} = \sum_{i=1}^{n} U_n(S_i) P(S_{n+1}^i / Z_{n+1}) \quad (7)$$

$$P(S_{n+1}^i / Z_{n+1}) = (const) \int f(Z_{n+1} / S_{n+1}^i, Z_n) \sum_{a=1}^{m} \Theta_{ai} P(S_n^i / Z_n) \quad (8)$$

where $Z_n$ denotes all the measurement up to and including time n+1, (i.e., $z_1, \ldots z_n$) and $S_{n+1}^i$ denotes the state $S_i$ at time n+1.

The probability density function $f(z_{n+1}/Z_n)$ has a Gaussian distribution with mean $H_{n+1}AX_n(S_i)+H_{n+1}BU_n(S_i)$ and variance $H_{n+1}[Am_{n/n}A^T+Q_n]H^T_{n+1}+R_n.M_{n/n}$ is the state estimation matrix; $R_n$ is the measurement error covariance matrix and $Q_n$ is the Gaussian disturbance covariance matrix.

The probability $\Theta_{ai}=P(U_n=S_i\backslash U_{n-1}=S_a)$ is obtained from semi-Markov considerations. This parameter can be approximated by a value p near unity for i=α and (1−p)/(m−1) for i≠α for many tracking situations.

The constant (const) is evaluated from $$\sum_{i+1}^{m} P(S_n^i / Z_n) = 1.$$

Based on the foregoing assumptions, an adaptive linear optimum (in the sense of minimum mean square error) filter is realized for estimating and predicting the dynamic states from the RSS measurements. As will be appreciated, the resulting algorithm is very simple and easily implemented in software:

Prediction $$X_{n+1/n} = AX_{n/n} + B\hat{U}_n \quad (9)$$

Minimum Prediction MSE Matrix $$M_{n+1/n} = AK_{n/n}A^T + Q \quad (10)$$

Kalman Gain Matrix $$K_{n+1} = M_{n+1/n}H_{n+1}^T[R_{n+1} + H_{n+1}M_{n+1/n}H_{n+1}] \quad (11)$$

Correction $$\hat{X}_{n+1/n+1} = \hat{X}_{n+1/n} + K_{n+1}[Z_{n+1} - h(\hat{X}_{n+1/n})] \quad (12)$$

Deterministic Input Update $$\hat{U}_n = \sum_{i=1}^{n} U_n(S_i) P(S_{n+1}^i / Z_{n+1}) \quad (13)$$

Minimum MSE Matrix Update $$M_{n+1/n+1} = [I - K_{n+1}H_{n+1}]M_{n+1/n} \quad (14)$$

where $$H_{n+1} = \frac{\partial h}{\partial X_{n+1}}\bigg|_{X_{n+1} = \hat{x}_{n+1/n}} \quad (15)$$

Figure 18:
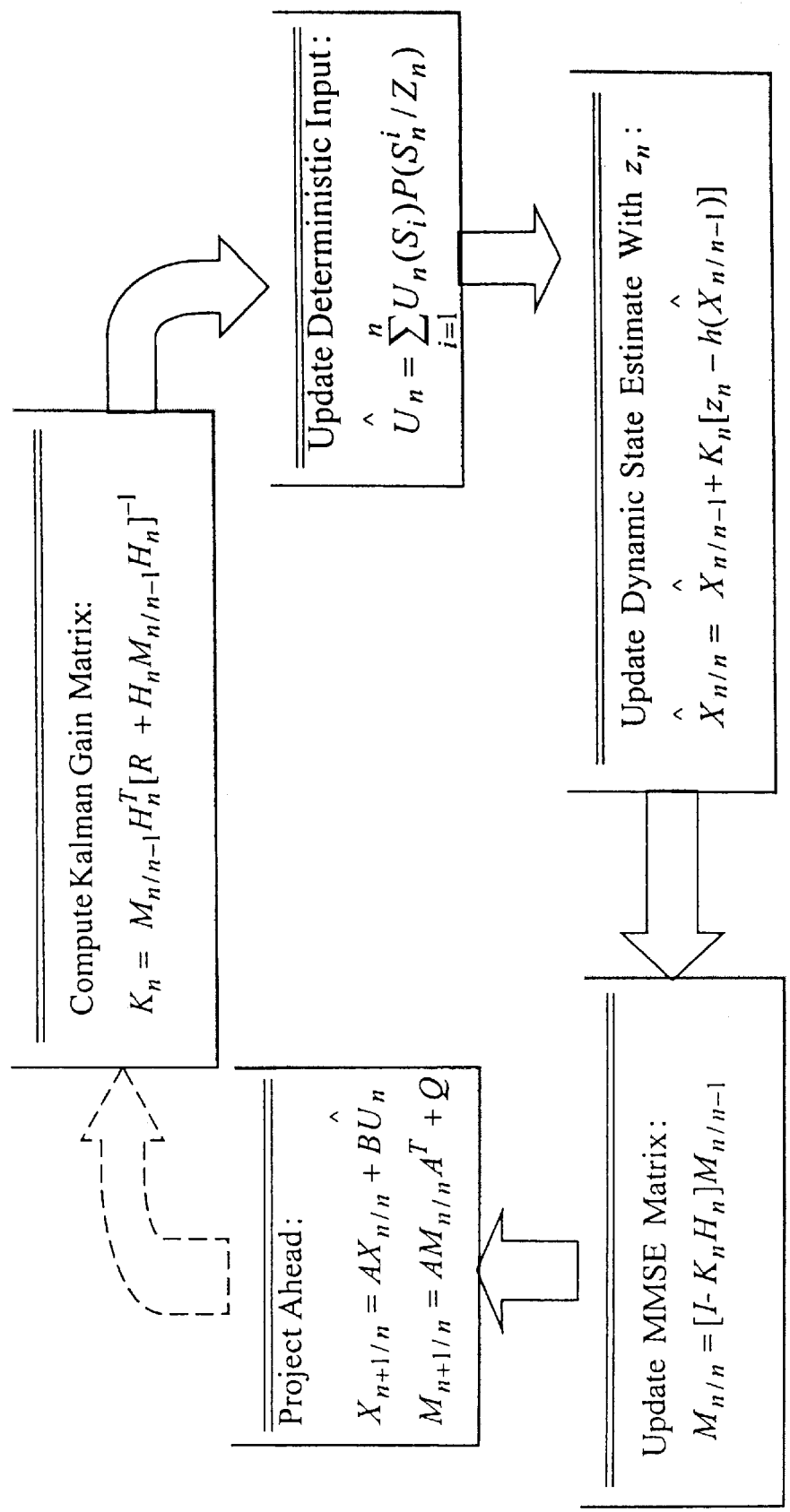
FIG. 18 is a flow diagram illustrating the recursive process of a dynamic linear filter for estimating the intra-cell trajectory of the mobile unit.

$P(S_{n+1}^i/Z_{n+1})$ for i=1, . . . , m can be obtained using the recursive equation (8). The above description can be summarized by the flow diagram illustrated in FIG. 18, which shows the recursive process of the dynamic linear filter for estimating the intra-cell trajectory of the mobile unit.

2. Predicting the Next Cell

The accuracy of the step of predicting of the next cell crossing (step 55 in FIG. 4) increases as the mobile closes on the boundary of the cell and where the chances of it making a dramatic change in its direction and speed are reduced. This area is called the "Correlation Area" of the neighboring cell$_i$, denoted as $\Gamma_i$=1, . . . 6, in the hexagon cell environment of FIG. 1.

The definition of the Correlation Area is as follows:

$$\Gamma_i = \{X | (x, y) \in \beta_i, d_0 \geq r, \text{ and } \theta \in [\theta_i, \theta_{i+1}]\} \quad (16)$$

where X is the dynamic (acceleration) state of the mobile unit MU, $d_0$ is the distance of the mobile unit from the current base station BTS, r is the threshold distance that determines the confidence in the prediction results, $\beta_i$ is the 60° sector adjacent to neighboring cell$_i$, and $\theta_i$, i=1, . . . 6 is the bearing of the cell vertex as shown in FIG. 8. The threshold distance r can be set dynamically to capture the relationship between the traveling speed of the mobile unit MU and the future sudden changes in direction and speed.

Since fast moving mobile units MU are more likely to follow straight line constant velocity trajectories than the slower ones, $d_t$ can be set dynamically to achieve early prediction for a given prediction confidence.

Once the moving user steps into the Correlation Area, cell-crossing probability of the mobile unit MU can be calculated based on the unit's dynamic state, i.e., $$P(Cell_i / X_n) = Q\left[\frac{\theta_{i+1} - \mu_\theta}{\sum \theta}\right] - \left[\frac{\theta_i - \mu_\theta}{\sum \theta}\right] \quad (17)$$

with i=1, . . . , 6, $\Theta_7 = \Theta_1$.

Applying the minimum error prediction criterion, the prediction result of next-crossing cell is:

$$P(cell_i / X(n)) = \frac{\theta_{i+1} - \theta_i}{2\pi}, \text{ with } i = 1, \ldots, 6, \theta_7 = \theta_1 \quad (18)$$

For more general cases, numerical methods may be used to calculate $f(\theta/X_n)$. However, if the variance of $\Theta$ is small, $f(\Theta/X_n)$ can be approximated by a Gaussian distribution. This is achieved by assuming that within the Correlation Area, there is only a small change in velocity, then the equation can be linearized as:

$$\Theta \approx g(V) + G(\Delta V)$$

where $$G = \frac{\partial g}{\partial V}\bigg|_{v=v^*} = \left[ \frac{-v_y(n)}{v_x^2 + v_y^w(n)} \quad \frac{v_x(n)}{v_x^2(n) + v_y^2(n)} \right] \quad (19)$$

$\Delta V$ is the change of velocity between time n and n+s with $S \leq 1$. Since $\Delta V$ has Gaussian distribution with mean $\mu_{\Delta V}$ and covariance $\Sigma_{\Delta V}$, $f(\theta/X_n)$ becomes:

$$f(\theta/X(n)) \sim N(\mu_\Theta, \Sigma_\Theta) \theta \in [\mu_\Theta - \pi, \mu_\Theta + \pi] \quad (20)$$

with $$\mu_\Theta = g(V) + H\mu_{\Delta v}; \Sigma_\Theta = H\Sigma_v H^T \quad (21)$$

Notice that for small $\Sigma_\Theta$, we assume $f(\Theta/X[n]) \approx 0$, if $\Theta \notin [\mu_\Theta - \tau, \mu_\Theta + \pi]$, then the cell crossing probability can be represented by a Q-function, i.e., $$P(Cell_i / X_n) = \left[ \frac{\theta_{i+1} - \mu_\Theta}{\Sigma_\theta} \right] - Q\left[ \frac{\theta_i - \mu_\Theta}{\Sigma_\theta} \right] \quad (22)$$

$\Theta_i$ can be easily calculated from cell geometry. For example:

$$\theta_1 = \tan^{-1}\left( \frac{R\cos 30° - (y(n) - b)}{R/2 - (x(n)a)} \right) \quad (23)$$

where R is cell radius, (x(n), y(n)) is the position of mobile station, and (a, b) is the location of the base station of current cell.

Although the calculations shown above are for the classical hexagonal cell geometry of FIG. 1, it will be appreciated that these same calculations can easily be carried out for a variety of other shapes as well, which may be closer to reality than the idealized coverage span considered here.

II. Applications of the HLP to Exemplary Wireless Cellular Systems

Both Kalman filtering and approximate pattern matching editing process have recursive natures and require only a modest use of storage in the memory 35 (FIG. 3), which makes it feasible to implement the invention as a low-power, embedded software process in the prediction engine 25. The computational load of a software process implementing a Kalman filtering may be further lowered by taking advantage of matrix sparseness or matrix symmetry techniques that significantly reduce the number of additions and multiplications needed to implement the matrix equations. E. Ukkonen, "Finding Approximate Patterns in Strings," *Journal of Algorithms* 6, 1985, pp. 132–137.

Furthermore, if the sampling rate of the signal is high (e.g., a sampling interval of 0.5 seconds), the error covariance and corresponding Kalman gain do not change much from one sample to the next. In such a case, instead of updating these quantities every sample cycle, doing so at a lower rate will result in a substantial amount of computational savings.

Moreover, to reduce signaling traffic, distribute computation load, and improve system security while still achieving location and speed prediction, the electronics for predicting the path of the mobile in keeping with the invention is preferably resident within the mobile rather than in the BSCs. By storing the historical patterns (UMPs) and the current movement history (UAP) within the mobile, security against unwanted predictors and locators is achieved. Additional information, such as a cell's identification number and the cell's topology are obtained from the BSC broadcasting on a protected control channel at the beacon frequency in each cell. The predicted path of the mobile as determined by the electronics in the mobile are transmitted to the MSC for managing the assignment of wireless channels to the various mobiles in keeping with the invention.

The following are examples illustrate how the hierarchical location prediction (HLP) invention is applied within a wireless cellular communications system. One of the examples includes a prediction-based dynamic virtual connection tree (PVCT) strategy for a Asynchronous Transport Mode (ATM) network, which provides enhanced management of the mobile's connection in keeping with the invention. Another example is also an ATM network, which includes a strategy incorporating prediction-based dynamic location updating. A third example illustrates how this invention is used to solve traffic congestion while improving system efficiency in wireless cellular communications systems. A forth and final example illustrates how HLP is used to lower the probability of pre-mature connection termination as the mobile unit rapidly moves through different cells in a wireless cellular communications network.

A. Prediction-based Dynamic Virtual Connection Trees

While keeping the advantages of the virtual connection tree approach described above in the "Background" section, its disadvantages are substantially reduced by dynamically allocating virtual connections (VCs) based on the location prediction of the invention. When a UMP is identified that matches the UAP, the mobile informs the BTS to which it is presently connected of the mobile's predicted route defined by the UMP and the mobile's predicted speed or its dwell time within the cell. Using this information, one or more of the MSCs sets up end-to-end connections with appropriate resources from the BTSs of the predicted cells. A set of virtual circuit identifier numbers (VCNs) is associated with these connections and passed on to the mobile. Each of these connections is maintained by the system (VCN stays valid) for a duration of time determined from the mobile's predicted velocity and predicted cell dwell-time. In the case when no UMP is identified that matches the UAP, VCNs of the most likely neighboring cells are assigned to the mobile based on the LP.

By relying on the UMP to reserve channels for smooth transition of the mobile from cell to cell, unwanted overloading of the cells is reduced, admission of the mobile into a new cell is faster and more reliable. Overall system efficiency is also improved since only a subset of the VCT footprint (cluster of BTSs) are involved in resource reservation for each connection of a mobile to the system. Thus, when the prediction ability of the UMP is incorporated into the VCT approach, there is a trade-off of minimal loss in the quality of service (QoS) reliability for vastly improved system efficiency when compared to the conventional VCT approach.

B. Prediction-based Dynamic Location Update

The invention assumes that on a global level, the movement pattern of the mobile unit MU is fairly regular and can be approximated by a representative UMP. Implicit in this assumption is the ability of the system to update the representative UMPs in the memory 33 as the regular patterns of the mobile's movement change over time. Therefore, for the purpose of location tracking, predefined zones or groupings of cells, as proposed in the two-tier architecture in B. A. Akyol and D. C. Cox, "Signaling Alternatives in a Wireless ATM Network," *IEEE Journal on Selected Areas in Communications,* Vol. 16, No. 5, January 1997, pp. 35–49, can dynamically be mapped to the matched UMP obtained from the global prediction (GP). In FIG. 1, each zone of cells is defined by the wired connections of BTSs to an individual one of the BSCs.

As long as the mobile follows the assumed UMP, updating of the mobile's location is not necessary, since the BTS of the current cell has informed the BTS of the cells in the predicted path by way of the BSC and the MSC (see FIG. 1). Therefore, the mobile can continue to use the network services without conventional registration and location updating procedures when it transitions into a new cell or arrives at a new zone.

In the special case when no UMP is found to match UAP, conventional methods for updating the location of the mobile are enabled to collect location information in keeping with conventional practice. As most mobile users are quite regular in their daily movement, however, the invention results in a significant reduction in signaling traffic due to location updating.

C. Congestion Relief using Line-of-Path Channel Borrowing

Unexpected growth of traffic in various cells can lead to local traffic congestion resulting in the creation of "hot-spot" cells, that is cells where the data traffic load substantially exceeds the design load. Prior approaches that have been proposed to alleviate congestion caused by unexpected uneven traffic loading in cells include (1) Cell Splitting and (2) Channel Borrowing.

The idea behind Cell Splitting as described in the paper by J. F. Whitehead, "Cellular spectrum efficiency via reuse planning," published in the *IEEE Vehicular Technology Conference Record,* 1985 pp. 16–20 is to create smaller cells called micro cells by reducing the radius-of-effect and thus creating additional channels through spectrum reuse. While Cell Splitting is most effective when there are a large number of hot-spot cells, it is expensive when congestion is in a few isolated cells. Creating micro-cells is undesirable since it requires additional equipment such as transceivers, antennas, power sources, data terminals and switches that increase the overall cost of the system considerably. Furthermore, many cells need to be split simultaneously before a frequency re-use pattern that avoids interference emerges.

Channel Borrowing as described in the paper by M. Zhang and T. S. Yum, "Comparisons of channel assignment strategies in cellular mobile systems," published in the *IEEE Vehicular Technology Journal,* November, 1989 issue proposes channel borrowing from adjacent cells as a method for relieving traffic congestion. Such channel borrowing is less costly than cell splitting and is most effective for the case of sparsely placed hot-spot cells. However, indiscriminate channel borrowing can adversely effect the lender's resources and create congestion elsewhere in the system.

An approach described in the paper by T-S. Yum T and W. S. Wong, "Hot Spot Traffic Relief in Cellular Systems," published in the *IEEE Journal on Selected Areas in Communications,* Vol. 11, No. 6, pp. 934–939, Aug. 1993, combines channel borrowing with cell sectorization to provide hot-spot traffic relief. Channel borrowing in sectorized cell induces more cell handoffs resulting in increased system complexity, increase system cost and reduces the probability of the system being able to provide any promised QoS.

As mentioned previously, when the traffic load in the neighboring cells is not light, indiscriminate channel borrowing can adversely effect the lender's resources and create congestion elsewhere in the system. By using trajectory prediction the network can relieve congestion in sparsely placed hot-spot cells through channel borrowing from adjoining cells that are in the mobile unit's predicted line-of-path. Queuing analysis of previous channel sharing strategies such as Dynamic Sharing with Bias and Join-Biased queuing, as proposed in T. S. Yum and M. Schwartz, "The join biased-queue rule and its application to routing in computer communication networks," published in the *IEEE Transactions on Communications,* April 1981 are effective in balancing the load in the presence of unbalanced traffic streams. This invention is different from those proposed earlier in that in addition to taking co channel interference and the number of available channels in the adjoining cells into account it also uses the direction-of-movement information of the mobile unit MU before lending channels. Direction of movement is dynamically predicted by the network using knowledge of the mobile unit's current location, its UAP and local estimation. The advantage of this invention is that it relieves congestion while reducing the number of handoffs, thus increasing the over-all system performance by reducing the probability of pre-mature connection termination. While schemes such as cell-splitting and cell sectoring increase cost of the system and increase the processing requirements of the system due to increased handoff, this invention actually reduces call handoff while providing congestion relief.

D. Handoff Management for Mobile Units in Wireless Cellular Systems

As described earlier, with this invention the wireless cellular system can predict the future speed and position of the mobile unit by processing observed signals (local estimation) and combining these with historical data (global estimation). Knowing the future trajectory or direction of travel of the mobile unit the cellular system can determine the cells that will be crossed by the mobile. For the case when idle channels are available in the cells that are in the mobile's path, a channel is reserved for the mobile under the category of "Predicted Handoff Call (PHC)". The PHC is given a priority that is higher than the priority given to new connection request that require use of the channel and that are being made by another unit originating in the cell where the resources are stored. The channel is reserved for the mobile unit which is expected to arrive in that cell within a threshold time as determined by the speed of the mobile and its distance from the cell. Thus, for the case when the base station has only one channel left the network will maintain the reservation for the mobile unit even when this channel is being requested by a new connection request. Overall system efficiency increases if the system can maintain on-going connection even at the expense of starting new connections. In order to further improve system efficiency, a threshold time is derived from the speed estimation information of the mobile, if the PHC doesn't arrive in the cell within this threshold, all reserved resources for it are released. This scheme performs better than schemes that are currently in use in first and second-generation cellular systems.

III. Verification of the Effectiveness of HLP

Figure 12:
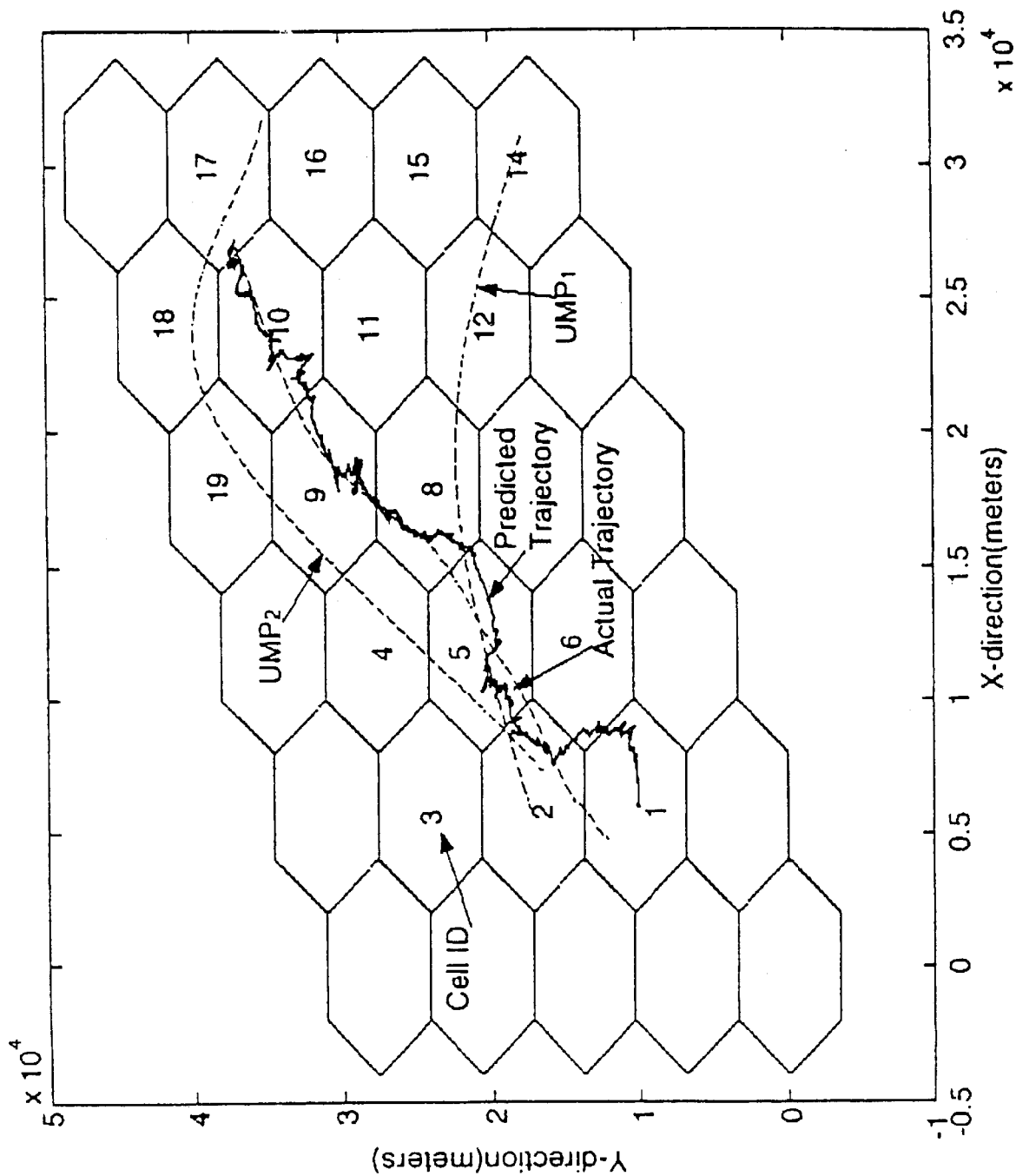
FIG. 12 is an illustration of a cellular network similar to that shown in FIG. 1 in which is demonstrated the performance of the invention in tracking the trajectory of three modeled mobile units.
Figure 14:
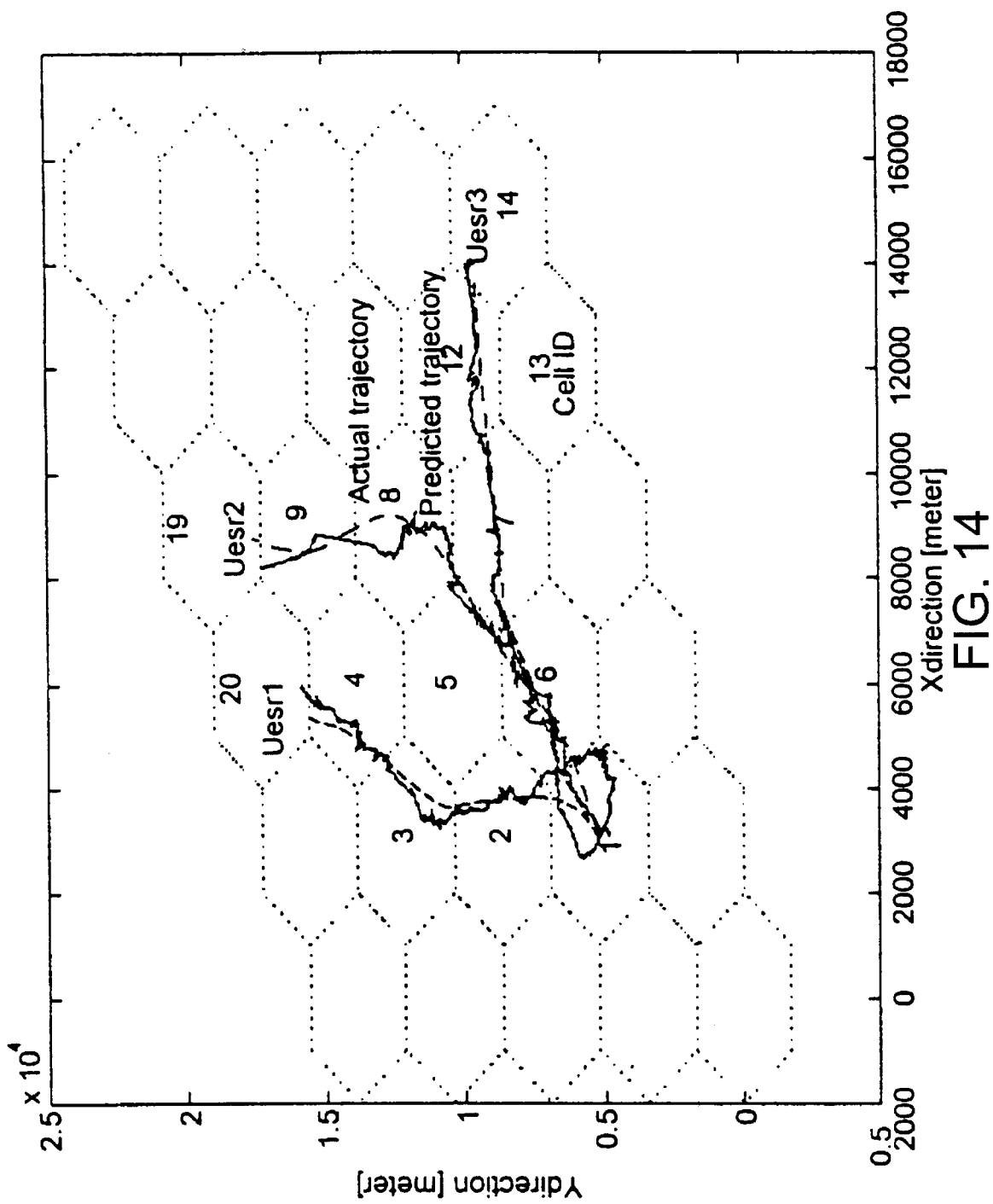
FIG. 14 is an illustration of a cellular network similar to that shown in FIGS. 1 and 12 in which is demonstrated the invention's success in predicting the overall route of a modeled mobile unit, where the mobile unit is modeled to have two possible routes labeled $UMP_1$ and $UMP_2$.

To examine the performance of HLP, a simple simulation is carried out for the conventional hexagon cell environment. The simulated service area contains 30 base stations with cell radius as 2 km and 4 km, as shown in FIG. 12 and FIG. 14 respectively. No constitutional constraints were assumed and the mobile was permitted to move to any cell in the network along random trajectories with non-constant speed. The moving dynamics were based on the movement model as discussed in T. Liu, P. Bahl and I. Chlamtac, "Mobility Modeling, Location Tracking, and Trajectory Prediction in Wireless ATM Networks," published in the IEEE Journal on Selected Areas in Communications, Vol. 16, No. 6, August 1998: 922–936. On-line mobility related information includes recently crossed cells stored in the mobility buffer memory 31 at the user end and subsequent forward link RSS measurements of current cell and two neighboring cells.

Simulation parameters are summarized in Table I below. In order to cover the range of dynamic acceleration $[-A_{max}, A_{max}]$, five levels $(0\pm2.5, \pm7.5)\text{m/s}^2$ are selected as the states of the deterministic driving input.

TABLE I

SIMULATION PARAMETERS

| Parameters | Comments |
|---|---|
| T = 0.5 s | Sampling interval |
| $\sigma^2_m$ = 0.5 m/s$^2$ | Variance of random acceleration |
| $|A_{max}|$ = 10 m$^2$/s | Maximum acceleration |
| V ∈ [30, 60] miles/hr | Speed range |
| 1/α = 10 s | Random acceleration constant |
| $\sigma_e$ = 5 dB | Standard deviation of lognormal shadowing |
| $P_0$ = 20 W | Base station transmission power |
| $g_b$ = 6 dB | Power gain of base station |
| $g_m$ = 1 dB | Power gain of mobile station |
| λ | Wavelength of RF Signal |

A. Results from Local Prediction

Figure 13:
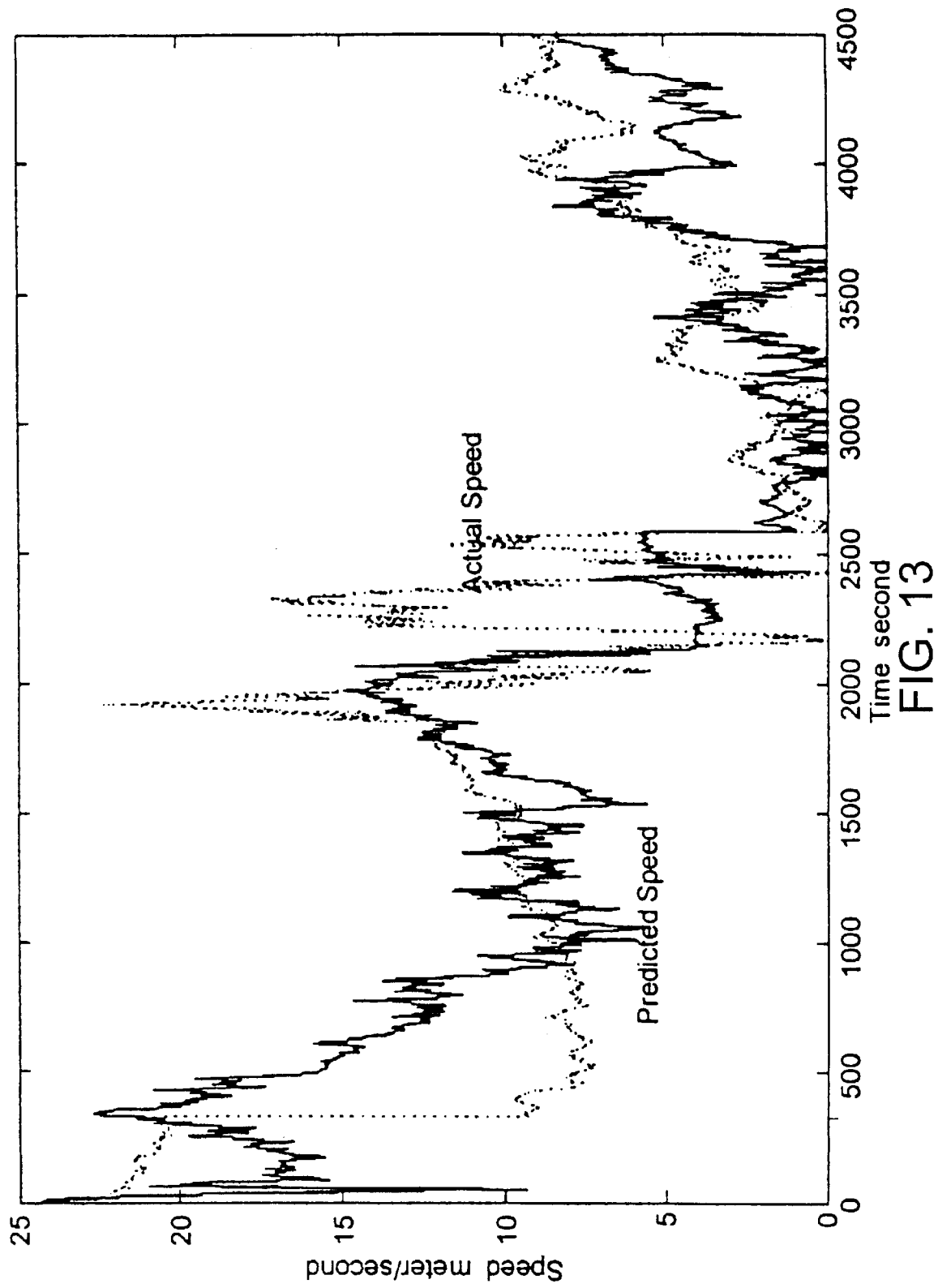
FIG. 13 is a graph illustrated the results provided by the mobile model of the invention's ability to predict the time-varying velocity of a mobile unit.

FIG. 12 shows the results from trajectory tracking of three moving users. The dashed curve depicts the actual trajectory (UAP), and the solid curve shows the predicted trajectory. FIG. 13 demonstrates the result of time-varying velocity prediction. The initial value of the dynamic state is estimated from the averaged RSS value with position error up to 1000 m and speed error up to 5 m/s. Because of the strong "pull in" power of the filter, it turns out that the adaptive filter is relatively insensitive to the initial conditions. The result of LP for next cell crossing is summarized in Table II below with prediction ratio=75%, 80%, 100% for User 1, 2 and 3, respectively. Here, the prediction ratio is defined as the ratio of the number of cells correctly predicted to the total number of cells need to be predicted in the path.

TABLE II

PREDICTED RESULT OF NEXT CELL CROSSING

| | | | | | | |
|---|---|---|---|---|---|---|
| User1 | Current Cell | 1 | 2 | 3 | 4 | 20 |
| | Predicted Cell | 6 | 3 | 4 | 20 | |
| User2 | Current Cell | 1 | 6 | 5 | 8 | 9 | 19 |
| | Predicted Cell | 6 | 5 | 7 | 9 | 19 | |
| User3 | Current Cell | 1 | 6 | 7 | 12 | 14 |
| | Predicted Cell | 6 | 7 | 12 | 14 | |

On analyzing prediction results of the next-cell crossing, together with the mobile's trajectory tracking, a high degree of prediction accuracy was achieved once the Kalman filter becomes stable. The error caused by the initial instability was limited to the prediction of the first-cell crossed at the beginning of the journey. In the stable state, the prediction accuracy was related to the geometric relation of mobile's trajectory and cell boundary, which can be compensated by UMP matching.

B. Results from Global Prediction

FIG. 15 shows the results from global prediction, where a moving user is simulated with two possible UMPs, $UMP_1$ ($c_2c_5c_8c_{12}c_{14}$) and $UMP_2$ ($c_2c_5c_4c_9c_{19}c_{18}c_{17}c_{16}$). In order to identify the UMP from the tracked UAP, the editing process is implemented as a recursive approximate pattern matching algorithm with the matching threshold t set at three (3) and the size of the UAP buffer memory 31 set as four (4), which means GP output is available when the user reaches to the fourth cell, $c_8$. GP output along the user moving path is given in Table III.

For cell $c_8$, the edit distance, for $UMP_1$ and $UMP_2$, is identical (i.e. $d_{ump1}$ and $d_{ump2}$ equal to 2). Since no pattern can be identified, HLP gives the prediction of next-cell crossed based on what is provided by LP. For cell $c_9$, $UMP_2$ is identified as the matched pattern, therefore, GP output becomes LP output ($c_{10}$) and the remaining cell sequence on $UMP_2$ ($c_{18}c_{17}c_{16}$).

The matrices of FIG. 15 show the edit distance calculation at cell $c_9$, which demonstrates the recursive procedure that are described above in connection with editing a UMP to match a UAP. Line segments in the matrices mark the direct arc in the dependency graph, going straight down or down at an angle or to the right. The path with minimum spatial weight may not be unique, which may result in different predictions. For example, in the matrix for $UMP_2$, if $c_{10}$ is viewed as the result of insertion, $c_{19}$ shall follow $c_{10}$ as part of the global prediction. Otherwise, the cell after $c_{10}$ should be $c_{18}$, since $c_{10}$ is the result of changing $c_{19}$. In this case, the second possibility is selected, which is reasonable since $c_{18}$ is closer to the destination.

It is important to note that at cell $c_9$, both $UMP_1$ and $UMP_2$ have two cells that appear in UAP, if the state-matching method is used instead (as described in G. Y. Liu and G. Q. Maguire Jr., "A Predictive Mobility Management Algorithm for Wireless Mobile Computation and Communication," *Proceedings of the IEEE International Conference on Universal Personal Communications*, 1995), $UMP_2$ would not be identified, since the $UMP_1$ and $UMP_2$ will have the same degree of similarity to UAP.

C. Prediction Performance

In this section, an average prediction performance of the inventive prediction system and method is evaluated.

Let $P_{1c}$ represent the probability of a correct local next cell prediction, $P(\text{cell}_i)$, i=1, . . . 6 denote the a priori probability of crossing a neighboring $\text{cell}_i$, and $P(\text{cell}_i/\text{cell}_j)$ represent the conditional probability that we decide $\text{cell}_i$ to be the next crossing cell given that $\text{cell}_j$ is the actual cell that the user will cross next. Then, $$P_{lc} = \sum_{i=1}^{6} P(\text{cell}_i) P(\text{cell}_i / \text{cell}_i) \qquad (28)$$

$$= P(\text{cell}_i / \text{cell}_i) \text{ since symmetric cell geometry}$$

$P(\text{cell}_i/\text{cell}_j)$ can be obtained by integrating over all possible values of dynamic state X:

$$P(cell_i / cell_i) = \int_\Omega P(cell_i, X / cell_i) dX \quad (29)$$

$$= \int_\Omega P(cell_i / X, cell_i) P(X / cell_i) dX$$

$$= \int_\Omega P(cell_i / X) P(X / cell_i) dx$$

Figure 16:
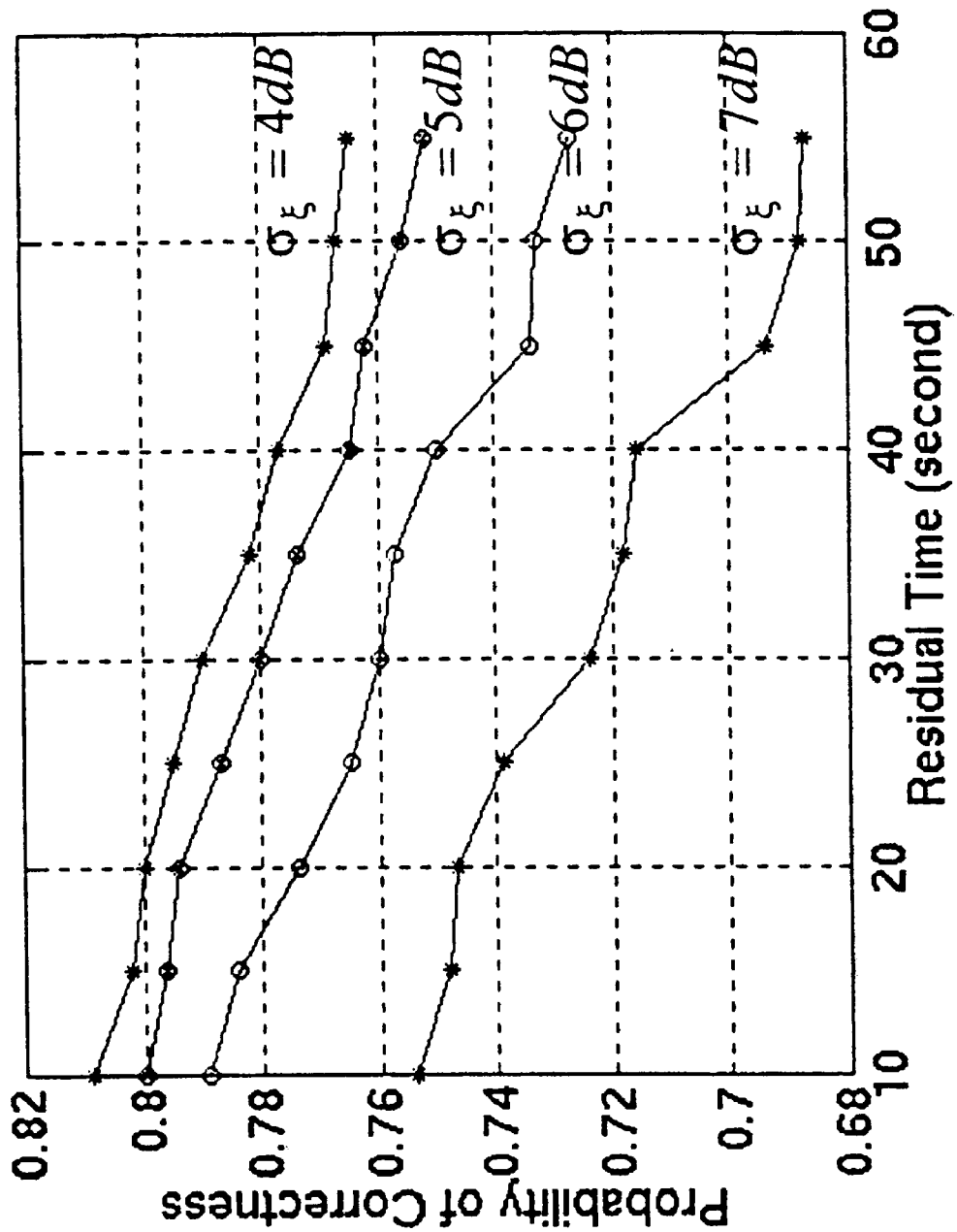
FIG. 16 is a graph of the parametric behavior of the probability of the correctness of the prediction of the next cell by the local prediction of the invention for the residual time between 10 and 50 seconds.
Figure 17:
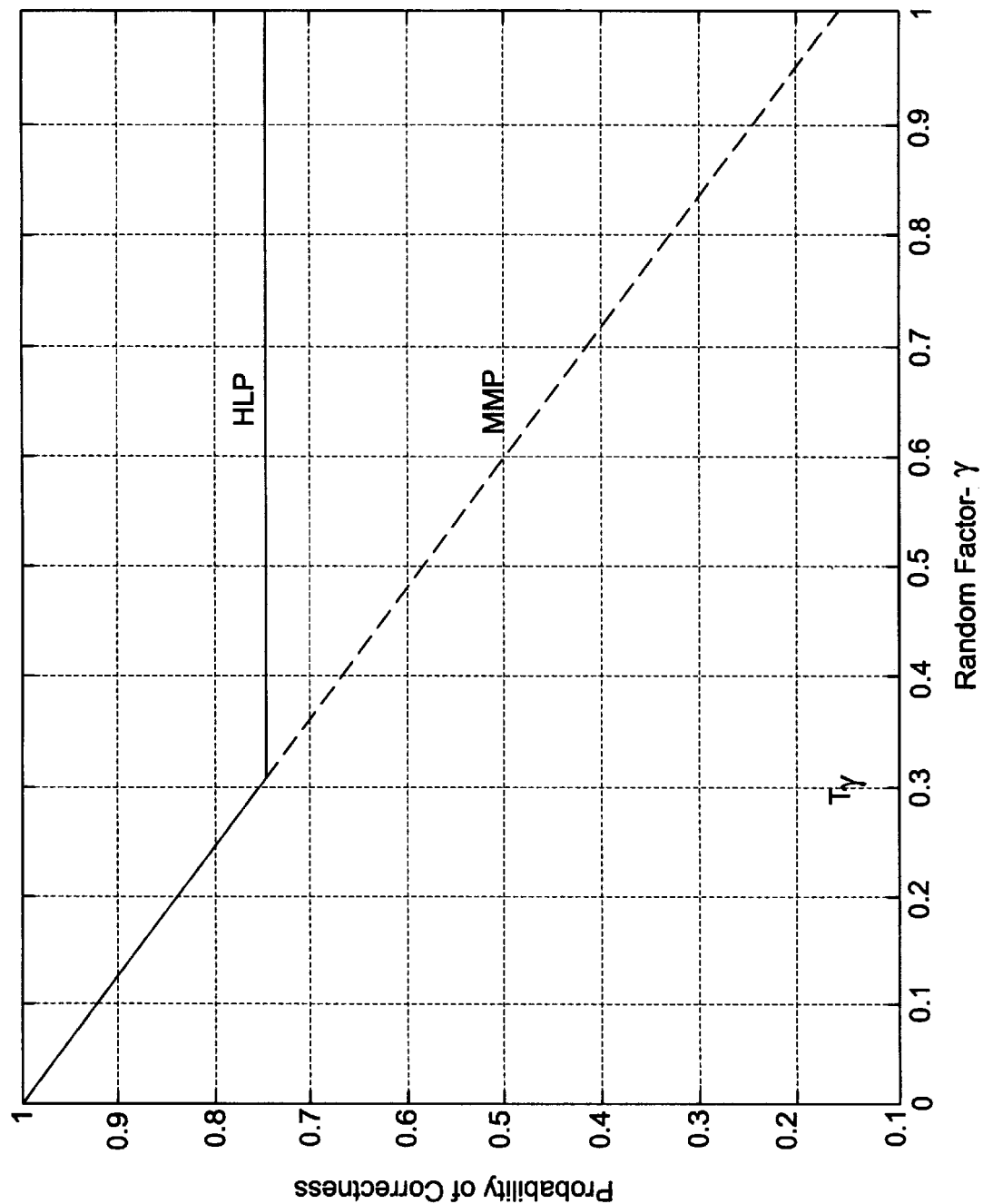
FIG. 17 shows the performance of the route prediction provided by the invention compared to a prior art prediction method.

The last equation is obtained due to the fact that local prediction, $P(cell_i/X)$, is independent of the mobility history reflected in $P(cell_i)$. Assuming the next-cell prediction is made when the user enters the correlation area $\Gamma_i$, and that, $P(X/cell_i)$ has uniform distribution over $\Gamma_i$, we can further simplify the estimation by only considering a finite number of positions on the boundary of correlation area, $\hat{A}B$, as shown in FIG. 8. Since $\hat{A}B \in \Gamma_i$, we have:

$$\int_{\hat{A}B} P(cell_i X/) \leq \int_{\Gamma_i} P(cell_i X/cell_i) \quad (30)$$

hence, the estimation results over $\hat{A}B$ can serve as a lower bound. $P_{correct}$ is further calculated for a spectrum of values representing standard deviation of log-normal shadowing $\sigma_\epsilon$ and the residual time when prediction is made, for a given acceleration range $[-A_{max}, A_{max}]$. FIG. 16 illustrates the parametric behavior of $P_{correct}$ for residual time between 10 s and 50 s, and standard deviation of shadowing from 4 dB to 8 dB with $A_{max}=10$ m/s$^2$. FIG. 17 can be extremely useful for providing a quick, first-cut estimate of prediction performance for the wireless ATM system.

For GP, if the mobile's movement is classifiable, i.e., a matched UMP has been found, prediction performance is linearly related to the mobile's random factor $\gamma$. ($\gamma$ determines the degree of randomness in choosing the next cell based on a Uniform distribution). See G. Y. Liu and G. Q. Maguire Jr., "A Predictive Mobility Management Algorithm for Wireless Mobile Computation and Communication," *Proceedings of the IEEE International Conference on Universal Personal Communications,* 1995). The probability of a correct GP is:

$$P_{gc} = 1 - \gamma \frac{n-1}{n} \quad (31)$$

where n is the number of neighboring cells from which the next cell for the mobile may be chosen. Obviously, GP is not reliable if $\gamma$ is high (unclassifiable movement in the Liu Maguire paper, which is identified above, corresponds to the case when $\gamma=1$). However, prediction of the next-cell to be crossed can still be achieved in HLP with a high degree accuracy since LP is completely independent of the long-term mobility patterns.

FIG. 17 shows the performance of the HLP prediction method in comparison to the MMP algorithm proposed in Liu article identified above. The figure illustrates next-cell prediction versus change in the random factor $\gamma$ used for UAP. With HLP, if $\gamma$ is greater than a threshold, $T_\gamma$, trajectory-tracking based LP is enabled for next-cell prediction. A logical choice of $T_\gamma$ is the value of $\gamma$ of the inflection point (0.3 in FIG. 17), i.e., $$T_\gamma = (1 - P_{lc}) \frac{n}{n-1} \quad (32)$$

In FIG. 17, the value of $P_{1c}$ is obtained for a residual time=30 seconds, $A_{max}=10$ m/s$^2$ and $\sigma_\epsilon=6$ dB. Comparing HLP with MMP (the dotted line obtained from pure pattern matching as in the Lui article identified above), it is clear that the prediction accuracy of HLP shows marked improvement over MMP unclassifiable inter-cell movement.

All of the references cited herein, including patents, patent applications, and publications, are hereby incorporated in their entireties by reference. Applicants also hereby incorporate by reference the following publication: Tong Liu, Paramvir Bahl and Imrich Chlamtac, "Mobility modeling, location tracking, and Trajectory Prediction In Wireless ATM Networks," *IEEE Journal On Selected Areas In Communications,* Vol. 16, No. 6, August 1998. Further information concerning the derivations of the mathematical relationships expressed herein can be found in the foregoing publication.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for maintaining a connection between a mobile communications unit and a cellular communications network, the method comprising the steps of: predicting a route of the unit through cells of the network by comparing a plurality of stored previous routes to an actual route of the unit, wherein the actual route includes cells the unit has crossed during the connection to the network and a predicted next cell that the unit will enter; and actively reserving one or more resources of the network for use by the unit based at least in part on the predicted route.

2. The method of claim 1 wherein the step of actively reserving bandwidth includes the step of a cell borrowing a channel assigned to another cell using mobile unit's movement information that is dynamically predicted.

3. The method of claim 2 wherein the borrowed channel is the same channel being used by the unit to communicate with the network.

4. The method of claim 2 wherein the borrowed channel is preferentially borrowed from an adjacent cell that is along the predicted route.

5. The method of claim 1 above wherein the step of predicting includes the step of generating a user profile containing predicted routes of the user based on routes through the network previously taken by the unit.

6. The method of claim 5 wherein the step of predicting includes the steps of recording the actual path of the unit through the cells of the network, editing one or more of the predicted routes to approximate the actual path of the user, selecting one of the edited routes as the predicted route.

7. The method of claim 1 wherein the steps of predicting the routing of the unit through the network is performed by the unit and communicated to the network, which responds to the receipt of the predicted routing by reserving bandwidth along the predicted route.

8. The method of claim 1 above wherein the step of predicting includes the steps of (i) recording the cells in the network crossed during the present connection of the unit to the network, (ii) predicting the next cell the unit will enter, and (iii) selecting as the predicted route one of several previous routes taken by the unit that best matches the actual path of the unit as determined from (i) and (ii).

9. The method of claim 1 including the steps of estimating the unit's intra-cellular trajectory, the trajectory including position, direction and velocity, and predicting the next cell the unit will enter based on the estimated trajectory.

10. The method of claim 9 wherein the step of predicting the next cell includes the step of applying a stochastic signal processing technique.

11. The method of claim 1 wherein the step of actively reserving bandwidth along the predicted route includes the step of estimating the unit's time of arrive (ETA) into the predicted next cell and reserving bandwidth within the predicted next cell for a time period based at least in part on the ETA of the unit into the predicted next cell.

12. The method of claim 11 wherein the reserved bandwidth is released if the user does not arrive at the predicted next cell within a time period equal to or greater than the ETA.

13. The method of claim 1 wherein the step of reserving bandwidth includes the step of handing off a channel assignment from a previous cell in the actual path to the predicted cell.

14. The method of claim 1 including the step of arbitrating between adjacent cells for identification of the predicted next cell when the predicted route of the unit meets predetermined criteria with respect to the unit's proximity to the border of the adjacent cells.

15. A system for predicting a route through a network by a network user during a connection between the network and the user, the system comprising: a profile of the network user containing a record of selected routes taken by the user for past connections to the network, wherein each of the routes in the record represents a plurality of routes resembling the recorded route, a memory containing a history of the cells through which the user has traveled during the connection, a sensor for providing a trajectory of the user during the present connection, a prediction engine responsive to the profile, the memory and the trajectory for predicting a sequence of network cells through which the user will pass for the remaining duration of the connection to the network, where the prediction is based on (1) determining an actual route of the user and (2) selecting a recorded route that best resembles the actual route from which the predicted sequence of network cells is determined.

16. The system of claim 15 including a mobile unit that contains the profile of the network user.

17. The system of claim 15 wherein the prediction engine includes a global predictor that identifies a recorded route having a cellular sequence that best fits the cellular sequence through which the user has traveled during the present connection.

18. The system of claim 17 wherein the mobile unit includes the global predictor.

19. The system of claim 17 wherein the prediction engine includes a local predictor that predicts the next cell of the network the user will enter based on the trajectory of the user.

20. The system of claim 15 wherein the network includes a processor for reserving network resources that reserves a channel for the user in a predicted next cell that is the same channel the user is assigned immediately prior to the user entering the predicted next cell.

21. The system of claim 15 wherein the prediction engine includes an editor that edits the recorded routes to match the path through the cells of the network taken by the mobile unit during the present connection.

22. The system of claim 21 wherein the editor includes criteria for selecting the recorded route that requires the least amount of editing to match the present path.

23. The system of claim 22 wherein the editor includes criteria for recognizing the present path as a new route to be recorded into the profile.

24. The system of claim 15 wherein the sensor includes an estimator responsive to a strength of a signal providing the connection between the mobile unit and the network.

25. The system of claim 24 wherein the estimator is a Kalman estimator.

26. The system of claim 15 wherein one of the criteria is that a recorded selected route differs from all other selected routes in the record by a threshold amount.

27. The system of claim 26 wherein at least one of the selected routes is recorded into a record as a difference from another selected route.

28. The system of claim 15 wherein the record includes attributes of the selected routes, including one or more of the following attributes: the frequency of the user taking each of the selected routes and the age of the last time the user has taken each of the selected routes.

29. The system of claim 15 wherein the recorded routes are indexed by a time at which they occurred.

30. A method for predicting the routing of a mobile communications unit through a communication network of cells, including the steps of: (i) creating a profile of the mobile communication unit's movement through the cells in the network during a connection of the unit to the network, the profile including an identification of the cells through which the unit has moved, (ii) predicting the next cell the unit will enter during the connection, and (iii) selecting as a predicted route one of several previous routes taken by the unit that best matches an actual path of the unit determined from steps (i) and (ii).

31. The method of claim 30 including the step of storing the differences between the route the unit is taking and an existing route the unit has taken.

32. The method of claim 30 wherein the profile has a data structure in which the routes are indexed by their occurrence times.

33. A method for reserving a resource along a predicted route of a mobile unit in a cellular communication network such that the unit maintains a constant channel assignment through one or more adjacent cells in an actual path of the unit, including the steps of (i) estimating the unit's time of arrive (ETA) into a predicted next cell, (ii) reserving the resource within the predicted next cell for a time period based at least in part on the ETA of the unit into the predicted next cell, and (iii) releasing the reserved resource if the unit does not arrive at the predicted next cell within a time period derived from the ETA.

34. A method for predicting a route of a mobile unit through a cellular communications network to which the mobile unit is connected, the method comprising the steps of:

predicting a next cell of the network the mobile unit will enter;

recording the mobile unit's actual route, which includes cells of the network through which the unit has passed and the predicted next cell;

comparing the actual route to one or more previous routes and generating from the comparison a measurement that quantifies a degree of resemblance between the actual route and each of the previous routes to which the actual route is compared; and selecting one of the stored routes as the predicted route for the present connection that best resembles the actual route based on an evaluation of the measurement.

35. The method of claim 34 wherein the step of comparing includes the step of measuring the resemblance of the actual route to the previous routes by (a) editing either the actual or one of the previous routes to match the other, and (b)

quantifying an amount of the editing required to match the actual and said one of the previous routes.

36. The method of claim 35 wherein the step of selecting includes selecting the previous route requiring the least amount of editing to match the actual route as the previous route best resembling the actual route.

* * * * *

UNITED STATES PATENT AND TRADEMARK OFFICE
CERTIFICATE OF CORRECTION

PATENT NO. : 6,385,454 B1
DATED : May 7, 2002
INVENTOR(S) : Bahl et al.

It is certified that error appears in the above-identified patent and that said Letters Patent is hereby corrected as shown below:

<u>Column 14,</u>
Line 51, (Equation 3), "$Z_n = h(X_n) + \in_n$" should read -- $Z_n = h(X_n) + \xi_n$ --.

<u>Column 16,</u>
Line 4, (Equation 11),
"$K_{n+1} = M_{n+1/n} H_{n+1} T [R_{n+1} + H_{n+1} M_{n+1/n} H_{n+1}]$" should read
-- $K_{n+1} = M_{n+1/n} H_{n+1}^T [R_{n+1} + H_{n+1} M_{n+1/n} H_{n+1}]$ --.

Line 28, "$P(S_{n+1}i / Z_{n+1})$" should read -- $P(S_{n+1}^i / Z_{n+1})$ --.

<u>Column 17,</u>
Line 24, "$\in$" should read -- $\varepsilon$ --.

<u>Column 21,</u>
Line 33, "$\in$" should read -- $\varepsilon$ --.

<u>Column 23,</u>
Line 66, "$\in$" should read -- $\varepsilon$ --.

Signed and Sealed this

Twenty-third Day of September, 2003

JAMES E. ROGAN
*Director of the United States Patent and Trademark Office*